(12) United States Patent  (10) Patent No.: US 7,506,012 B2
Nishikawa et al.  (45) Date of Patent: Mar. 17, 2009

(54) METHOD AND COMPUTER SYSTEM FOR ALLOCATING DATABASE DATA BASED ON ACCESS FREQUENCY

(75) Inventors: Norifumi Nishikawa, Machida (JP); Kazuhiko Mogi, Yokohama (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 424 days.

(21) Appl. No.: 11/153,439

(22) Filed: Jun. 16, 2005

(65) Prior Publication Data

US 2006/0184565 A1 Aug. 17, 2006

(30) Foreign Application Priority Data

Feb. 14, 2005 (JP) ............................. 2005-035863

(51) Int. Cl.
G06F 12/00 (2006.01)
(52) U.S. Cl. ..................................................... 707/205
(58) Field of Classification Search ................. 707/200, 707/1, 12, 100
See application file for complete search history.

(56) References Cited

U.S. PATENT DOCUMENTS 6,035,306 A 3/2000 Lowenthal et al.
6,493,762 B1 * 12/2002 Chen et al. .................. 709/231
2004/0078518 A1 * 4/2004 Kuwata ....................... 711/113

FOREIGN PATENT DOCUMENTS

JP 2003-150414 5/2003

OTHER PUBLICATIONS

Huan et al., Journal of Information Science and Engineering 17, pp. 491-506, 2001.*
Chakravarthy et al., Distributed and Parallel Databases 2, Kluwer Publishers, Boston, pp. 183-207, 1994.*
Du et al., IEEE, pp. 74-81, 1988.*
Weikum et al., Dynamic file allocation in disk arrays, ACM SIGMOD Record, v.20 n.2, p. 406-415, Jun. 1991.*
George et al.,Data placement in Bubba, Proceedings of the 1988 ACM SIGMOD international conference on Management of data, p. 99-108, Jun. 1-3, 1988, Chicago, Illinois, United States.*

* cited by examiner

Primary Examiner—Cheyne D Ly
(74) Attorney, Agent, or Firm—Mattingly, Stanger, Malur & Brundidge, P.C.

(57) ABSTRACT

A computer is used in a computer system including multiple physical storage areas for storing database data. The database includes component information having a reference item having plural value ranges. The database data is dividable according to value ranges of the reference item. The computer comprises an access frequency obtaining module and a data allocation module. The access frequency obtaining module obtains, for each value range of the reference item in the component information, an estimated access frequency for data of the component information. The data allocation module allocates, based on the obtained estimated access frequency, data of the component information divided according to the value ranges of the reference item to the physical storage areas to be stored.

13 Claims, 18 Drawing Sheets

| TABLE | DISK GROUP |
|-------|------------|
| S1-T1 | D1-DG1 , D1-DG2 |
| S1-T2 | D1-DG1 , D1-DG2 |

~120

~130

| TIME | S1-T1[1-10] | S1-T1[11-20] | S1-T2[1-10] | S1-T2[11-20] |
|------|-------------|--------------|-------------|--------------|
| DAY 1 | 10 | 10 | 10 | 30 |
| DAY 2 | 25 | 5 | 15 | 15 |

Fig.7
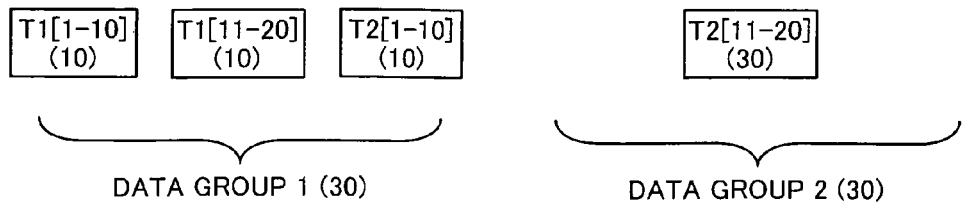
Fig.8
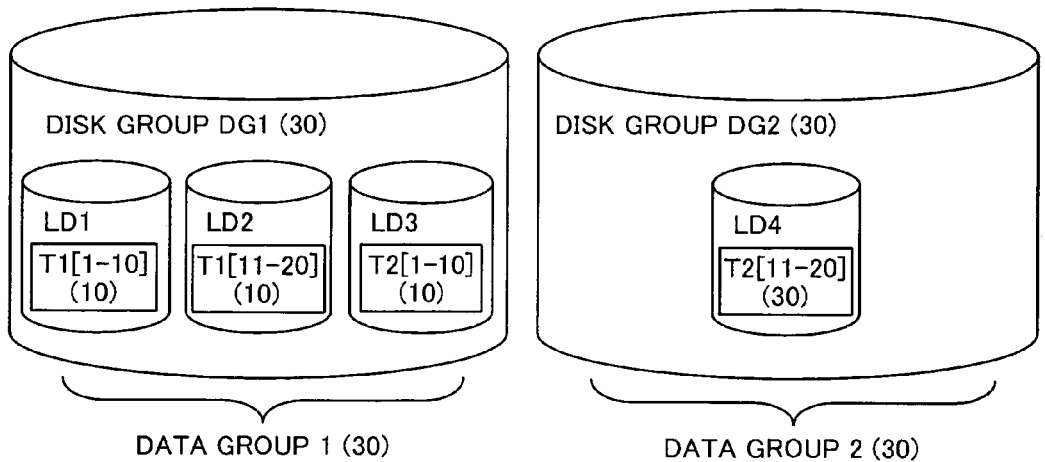
Fig.9
| APPLICATION SERVER | TABLE | KEY VALUES | STORAGE DEVICE SYSTEM | LOGICAL DEVICE | DISK GROUP |
|---|---|---|---|---|---|
| S1 | T1 | 1-10 | D1 | LD1 | DG1 |
| S1 | T1 | 11-20 | D1 | LD2 | DG1 |
| S1 | T2 | 1-10 | D1 | LD3 | DG1 |
| S1 | T2 | 11-20 | D1 | LD4 | DG2 |
140

| APPLICATION SERVER | TABLE | KEY VALUES | STORAGE DEVICE SYSTEM | LOGICAL DEVICE | DISK GROUP |
|---|---|---|---|---|---|
| S1 | T1 | 1-10 | D1 | LD1 | DG1 |
| S1 | T1 | 11-20 | D1 | LD2 | DG2 |
| S1 | T2 | 1-10 | D1 | LD3 | DG2 |
| S1 | T2 | 11-20 | D1 | LD4 | DG2 |

140

Fig.17
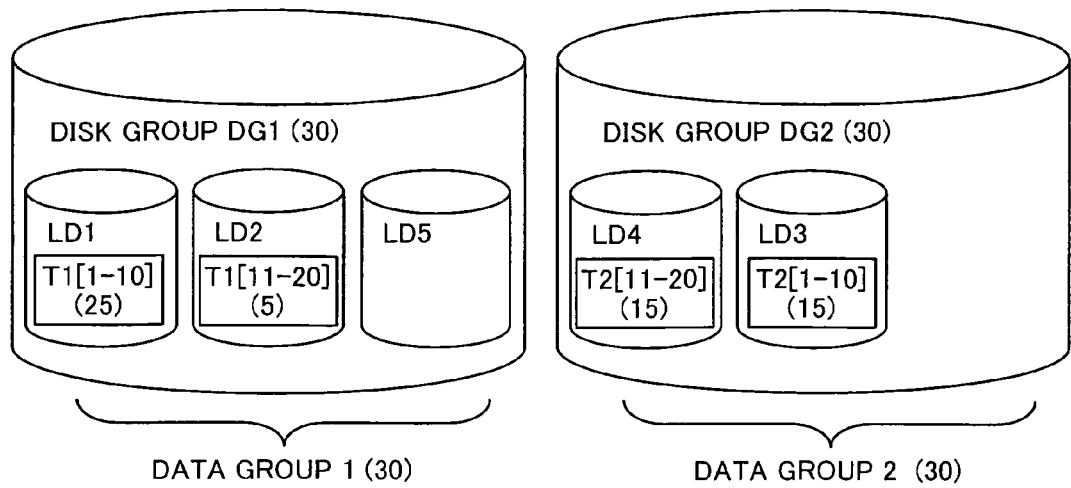
Fig.18
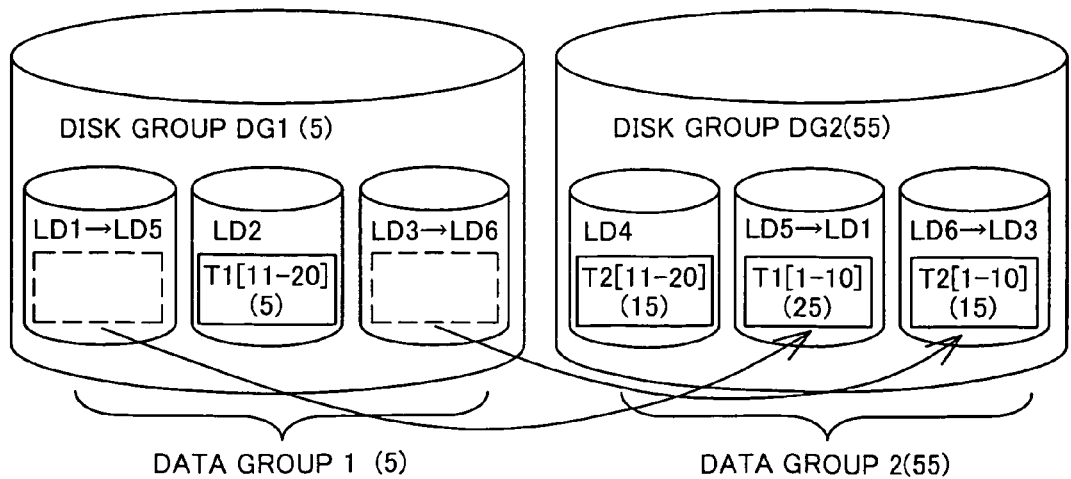
Fig.19

| APPLICATION SERVER | TABLE | KEY VALUES | STORAGE DEVICE SYSTEM | LOGICAL DEVICE | DISK GROUP |
|---|---|---|---|---|---|
| S1 | T1 | 1-10 | D1 | LD1 | DG2 |
| S1 | T1 | 11-20 | D1 | LD2 | DG1 |
| S1 | T2 | 1-10 | D1 | LD3 | DG2 |
| S1 | T2 | 11-20 | D1 | LD4 | DG2 |

| TIME | S1-T1[1-10] | S1-T1[11-20] | S1-T2[1-10] | S1-T2[11-20] |
|---|---|---|---|---|
| DAY 1 | 10 | 10 | 10 | 30 |
| DAY 2 | 10 | 10 | 10 | 30 |

| TIME | S1-T1[11-20] |
|---|---|
| DAY 2 | ADDITIONAL 10 |

| APPLICATION SERVER | TABLE | KEY VALUES | STORAGE DEVICE SYSTEM | LOGICAL DEVICE | DISK GROUP |
|---|---|---|---|---|---|
| S1 | T1 | 1−10 | D1 | LD1 | DG1 |
| S1 | T1 | 11−20 | D1 | LD2 | DG1 |
| S1 | T2 | 1−10 | D1 | LD3 | DG2 |
| S1 | T2 | 11−20 | D1 | LD4 | DG2 |

140

| APPLICATION SERVER | TABLE | KEY VALUES | STORAGE DEVICE SYSTEM | LOGICAL DEVICE | DISK GROUP |
|---|---|---|---|---|---|
| S1 | T1 | 1−10 | D1 | LD1 | DG1 |
| S1 | T1 | 11−20 | D1 | LD2 | DG2 |
| S1 | T2 | 1−10 | D1 | LD3 | DG1 |
| S1 | T2 | 11−20 | D1 | LD4 | DG2 |

| TABLE | DISK GROUP |
|---|---|
| S1-T1 | D1-DG1 , D2-DG2 |
| S2-T2 | D1-DG1 , D2-DG2 |

| TIME | S1-T1[1-10] | S1-T1[11-20] | S2-T2[1-10] | S2-T2[11-20] |
|---|---|---|---|---|
| DAY 1 | 10 | 10 | 10 | 30 |
| DAY 2 | 25 | 5 | 15 | 15 |

| APPLICATION SERVER | TABLE | KEY VALUES | LOGICAL VOLUME | PHYSICAL VOLUME | STORAGE DEVICE SYSTEM | LOGICAL DEVICE | DISK GROUP |
|---|---|---|---|---|---|---|---|
| S1 | T1 | 1-10 | LV1 | PV1 | D1 | LD1 | DG1 |
| S1 | T1 | 11-20 | LV2 | PV2 | D1 | LD2 | DG1 |
| S2 | T2 | 1-10 | LV5 | PV4 | D1 | LD3 | DG1 |
| S2 | T2 | 11-20 | LV6 | PV5 | D2 | LD4 | DG2 |

METHOD AND COMPUTER SYSTEM FOR ALLOCATING DATABASE DATA BASED ON ACCESS FREQUENCY

CROSS REFERENCE TO RELATED APPLICATIONS

The present application claims the priority based on Japanese Patent Application No. 2005-35863 filed on Feb. 14, 2005, the disclosure of which is hereby incorporated herein by reference in its entirety.

BACKGROUND OF THE INVENTION

1. Field of the Invention

The present invention relates to a technology for setting allocation of database data in a computer system.

2. Description of the Related Art

In a computer system that handles database containing large amount of data, the database data is generally stored in physical storage areas (such as disks) belonging to a storage device system (such as a storage system). A database management system (hereinafter 'DBMS') that runs on a computer belonging to the computer system performs database-related processing accessing the database data stored in the physical storage areas of the storage device system. Consequently, DBMS processing performance is affected by data access performance for the physical storage areas in which the database data is stored. The data access performance for the physical storage areas fluctuates depending on the frequency with which the data stored in each physical storage area is accessed by the DBMS. Therefore, in order to increase DBMS processing performance, it is important to set allocation of the database data in the physical storage areas while taking into consideration the frequencies with which the physical storage areas are accessed.

A technology is described in JP2003-150414A, for example, for estimating the access frequencies for the physical storage areas using allocation information that indicates the relationships between a table or the like composing a database and the physical storage areas in which the table or other data is stored, as well as history information regarding processing commands (such as SQL phrases) executed by the DBMS. A technology is also described in U.S. Pat. No. 6,035,306, for example, for notifying an administrator of a problem about the allocation of database data within physical storage areas using allocation information that indicates the relationships between a table or the like composing a database and the physical storage areas in which the table or other data is stored, as well as the results of monitoring of the access frequencies for the physical storage areas.

In general, the data for tables or the like composing a database is divided and allocated across multiple physical storage areas. There are often variations in data storage density among the various physical storage areas, as well as variations in the frequency of DBMS access, depending on the table and other data allocated to each physical storage area. Furthermore, these variations often change during database use. Consequently, using the above prior art technologies, it is difficult to accurately monitor or estimate the access frequencies for the various physical storage areas, making it difficult to set the allocation of database data among the various physical storage areas while taking into account the physical storage area access frequencies.

SUMMARY OF THE INVENTION

An object of the present invention is to provide a technology to enable allocation of database data among physical storage areas to be set while taking into account the access frequencies for these various physical storage areas.

In one aspect of the present invention, there is provided a computer for use in a computer system including multiple physical storage areas for storing database data. The database includes component information having a reference item having plural value ranges. The database data is dividable according to value ranges of the reference item. The computer comprises an access frequency obtaining module and a data allocation module. The access frequency obtaining module obtains, for each value range of the reference item in the component information, an estimated access frequency for data of the component information. The data allocation module allocates, based on the obtained estimated access frequency, data of the component information divided according to the value ranges of the reference item to the physical storage areas to be stored.

With this computer, estimated access frequency for data of the component information is obtained for each value range of the reference item, and data of the component information divided according to the value ranges of the reference item can be allocated to the physical storage areas to be stored based on the obtained estimated access frequency. Consequently, with this computer, database data can be allocated to physical storage areas while taking into account the frequency with which each physical storage area is accessed.

The present invention can be realized in a various aspects. For example, the present invention can be realized in aspects such as a computer, a computer system, a data allocation setting method and device, a data allocation management method and device, a data storage method and device, a data migration method and device, a computer program for effecting the functions of such methods or devices, a computer program set including such computer program, a recording medium for recording such computer program, and data signals in which such a computer program is carried on the carrier wave.

Where the present invention is composed as a computer program or a recording medium on which such computer program is recorded, the program may comprise a program that controls the overall operation of the computer system or a program that separately controls the operation of each computer or each storage device system.

These and other objects, features, aspects, and advantages of the present invention will become more apparent from the following detailed description of the preferred embodiments with the accompanying drawings.

BRIEF DESCRIPTION OF THE DRAWINGS

FIG. 7 is an explanatory drawing showing an example of the setting of data groups;

FIG. 8 is an explanatory drawing showing an example of disk group and logical device allocation;

FIG. 9 is an explanatory drawing showing an example of map information 140;

FIG. 17 is an explanatory drawing showing the allocation of tables after the correspondences between disk groups and logical devices are reset;

FIG. 18 is an explanatory drawing showing an example of map information 140 created after the correspondences between disk groups and logical devices are reset;

FIG. 19 is an explanatory drawing showing an example of data allocation setting in a variation of the Embodiment 2;

FIG. 29 is an explanatory drawing showing an example of table/disk group correspondence 120 obtained during the initial allocation process;

FIG. 30 is an explanatory drawing showing an example of key value-specific access frequency 130 obtained during the initial allocation process;

FIG. 31 is an explanatory drawing showing an example of map information 140 after the initial allocation process is completed;

DESCRIPTION OF THE PREFERRED EMBODIMENT

Next, aspects of the present invention will be described in the following order on the basis of embodiments:
A. Embodiment 1
B. Embodiment 2
C. Embodiment 3
D. Embodiment 4
E. Variations

A. Embodiment 1

Figure 1:
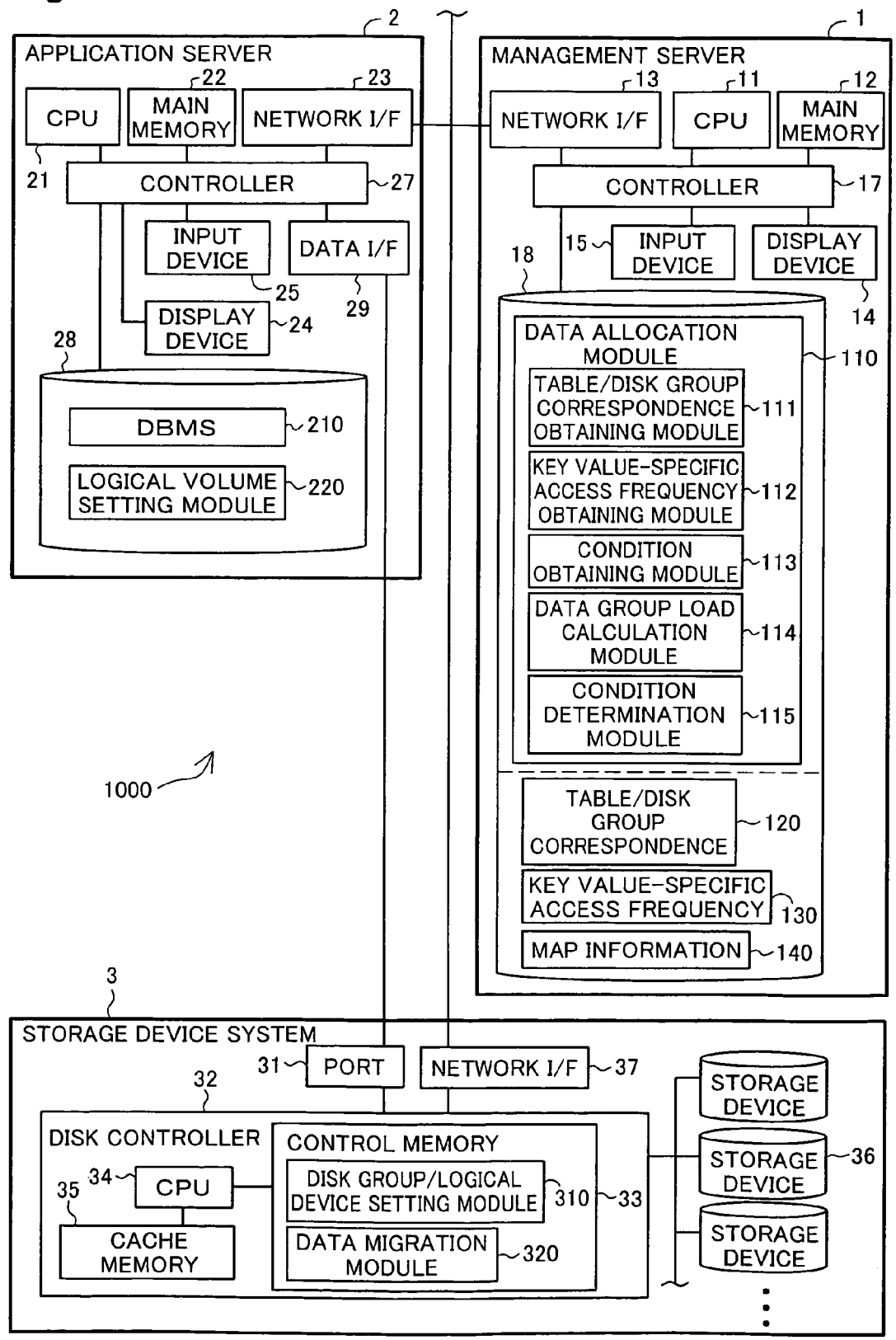
FIG. 1 is a block diagram showing construction of a computer system in Embodiment 1 of the present invention.

FIG. 1 is a block diagram showing construction of a computer system in Embodiment 1 of the present invention. The computer system 1000 in the Embodiment 1 comprises a management server 1, an application server 2 and a storage device system 3. The management server 1, application server 2 and storage device system 3 are mutually interconnected via network I/Fs (network I/Fs 13, 23, 37) possessed by each.

The application server 2 is a computer that performs various types of data processing work using a database, and has a CPU 21, a main memory 22, a network I/F 23, a display device 24 such as a display monitor, an input device 25 such as a keyboard, a storage device 28 such as a hard disk drive, a data I/F 29 and a controller 27 that connects these various units with one another.

A DBMS (database management system) 210 and a logical volume setting module 220 are stored in the storage device 28 of the application server 2. The DBMS 210 is a computer program that manages the database and responds to a request from an application program to access the database, for example. The logical volume setting module 220 is a computer program that sets up and manages logical volumes described below. The CPU 21 of the application server 2 realizes the functions possessed by these computer programs by reading them from the main memory 22 and executing them.

The application server 2 is connected directly to the storage device system 3 via the data I/F 29, and exchanges commands and data with the storage device system 3 through this connection.

The storage device system 3 is a storage system that stores database data, and has a disk controller 32 that controls the entire storage device system 3, multiple storage devices 36, a port 31 used to directly connect the storage device system 3 to the data I/F 29 of the application server 2, and a network I/F 37.

The storage device 36 is a unit component of a physical storage area. The database data is physically stored in a storage device 36. A storage device 36 may comprise any of various types of devices that can store data, such as an optical disk or a magnetic disk.

The disk controller 32 includes a CPU 34, a control memory 33 and a cache memory 35 that temporarily stores commands or data. A disk group/logical device setting module 310 and a data migration module 320 are stored in the control memory 33. The disk group/logical device setting module 310 is a computer program that sets up disk groups and logical devices described below. The data migration module 320 is a computer program that migrates data among the storage devices 36. The CPU 34 of the storage device system 3 realizes the functions possessed by these computer programs by executing such programs.

The management server 1 is a computer that sets allocation of database data in the computer system 1000, and has a CPU 11, a main memory 12, a network I/F 13, a display device 14 such as a display monitor, an input device 15 such as a keyboard, a storage device 18 such as a hard disk drive, and a controller 17 that mutually interconnects these various components.

A data allocation module 110 is stored in the storage device 18 of the management server 1. The data allocation module 110 is a computer program that sets allocation of database data, and includes a table/disk group correspondence obtaining module 111, a key value-specific access frequency obtaining module 112, a condition obtaining module 113, a data group load calculation module 114 and a condition determination module 115, all of which are computer programs. The CPU 11 of the management server 1 executes data allocation process described below by reading these programs from the main memory 12 and executing them.

In the data allocation process described below, a table/disk group correspondence 120, a key value-specific access frequency 130 and a map information 140 are stored in the storage device 18 of the management server 1. The details of such information will be described below.

Figure 2:
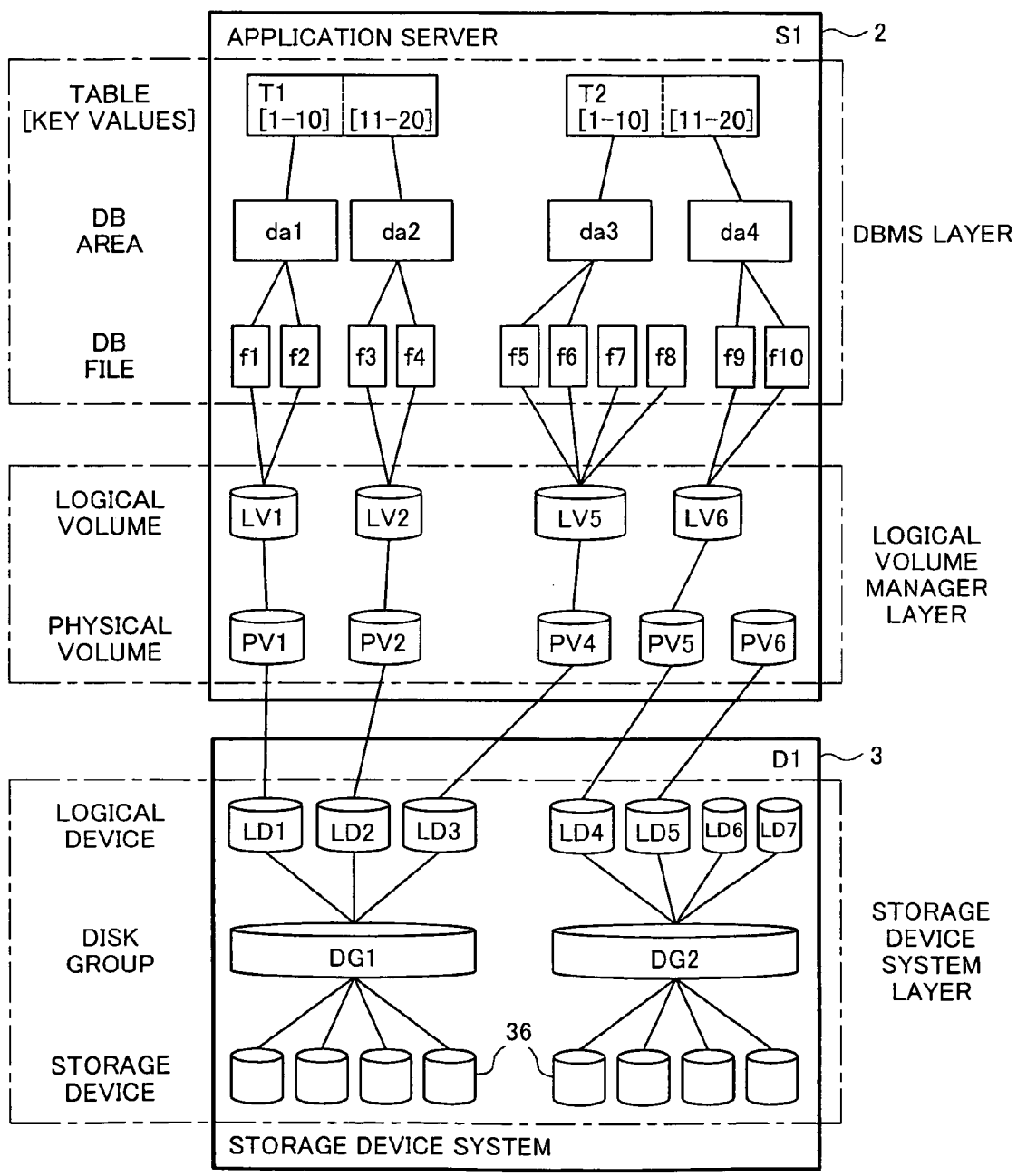
FIG. 2 is a block diagram showing conceptually the hierarchical structure of the allocation of database data in the computer system 1000 in the Embodiment 1.

FIG. 2 is a block diagram showing conceptually the hierarchical structure of the allocation of database data in the computer system 1000 in the Embodiment 1. As described below, the database data is stored in the storage device system 3 and used by the application server 2. In this Embodiment, the server name of the application server 2 is set as 'S1', while the system name of the storage device system 3 is set as 'D1'.

In the storage device system 3, the database data is stored in storage devices 36 that serve as a unit component of a physical storage area. Within the storage device system 3, disk groups (DG) and logical devices (LD) are defined. A disk group is a collection of one or more storage devices 36, and a particular disk group area is physically separate from a different disk group area. On the other hand, a logical device is an area resulting from the logical division of a disk group into one or more such areas, and a particular logical device area is not physically separate from a different logical device area. The storage device system 3 has information indicating this hierarchical structure.

In the application server 2, a logical volume manager layer that is managed by the OS (operating system) and a DBMS layer that is managed by the DBMS 210 (FIG. 1) are configured. In the logical volume manager layer, physical volumes (PV) that serve as OS-recognized storage areas and logical volumes (LV) resulting from the division of physical volumes into one or more logical areas are defined. A physical volume is associated with a particular logical device within the storage device system 3. In the DBMS layer, DB areas (da) that serve as logical areas managed by the DBMS 210 and DB files (f) that form DB areas are defined. A DB area comprises one or more DB files. Each DB file is associated with a particular logical volume. The application server 2 has information indicating the hierarchical structure of the application server 2 and information indicating the correspondences among the physical volumes and the logical devices.

The management server 1 (FIG. 1) has information indicating the hierarchical structure of database data allocation within the computer system 1000 shown in FIG. 2.

When defining component information (such as tables or indices) composing a database, the DBMS 210 that performs database management (FIG. 1) specifies one or more DB areas to store the component information to be defined. The component information is stored in the specified DB area or areas as a single unit or after being divided into parts. Here the component information data is physically stored in a storage device or devices 36 of the storage device system 3 in accordance with the hierarchical structure shown in FIG. 2. In the example of FIG. 2, the tables T1 and T2 are each split into two parts that are each stored separately in a specified DB area. For example, one part of the table T1 (called 'T1 [1-10]') is stored in the DB area da1. Here, the data for this part ('T1 [1-10]') is physically stored in the storage devices 36 composing the disk group DG1 of the storage device system 3. In the example of FIG. 2, each table (T1 and T2) is divided into two parts in accordance with a range of key values (indicated by brackets), but this feature will be described in more detail below.

Figure 3:
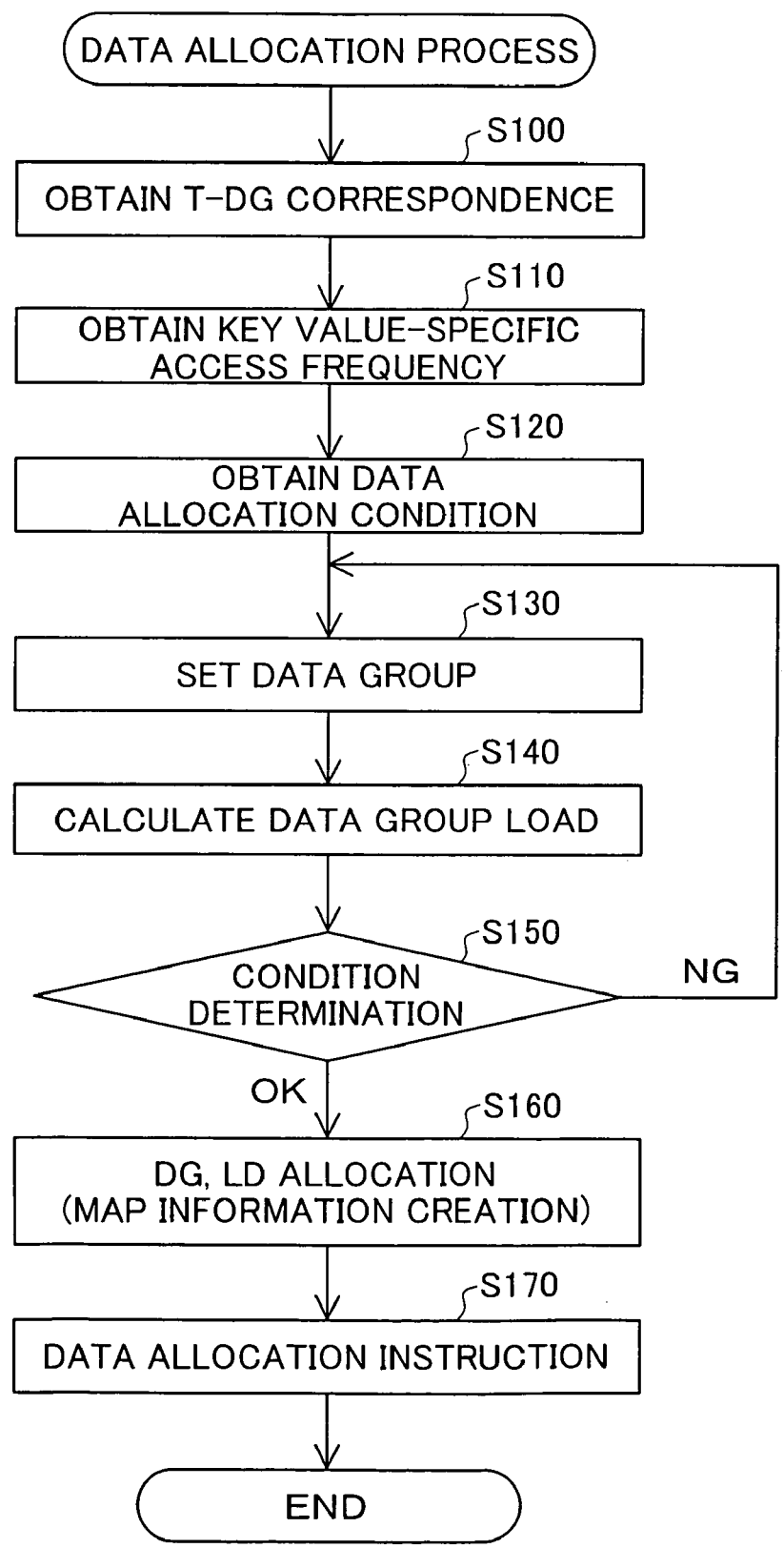
FIG. 3 is a flow chart showing the flow of the data allocation process executed in the Embodiment 1.

FIG. 3 is a flow chart showing the flow of the data allocation process executed in the Embodiment 1. The data allocation process in the Embodiment 1 is a process for setting the allocation of component information (such as tables or indices) of a database in the storage device system 3 when the DBMS 210 (FIG. 1) defines such component information, and is executed by the data allocation module 110 (FIG. 1) of the management server 1.

Figures 4, 5, 6:
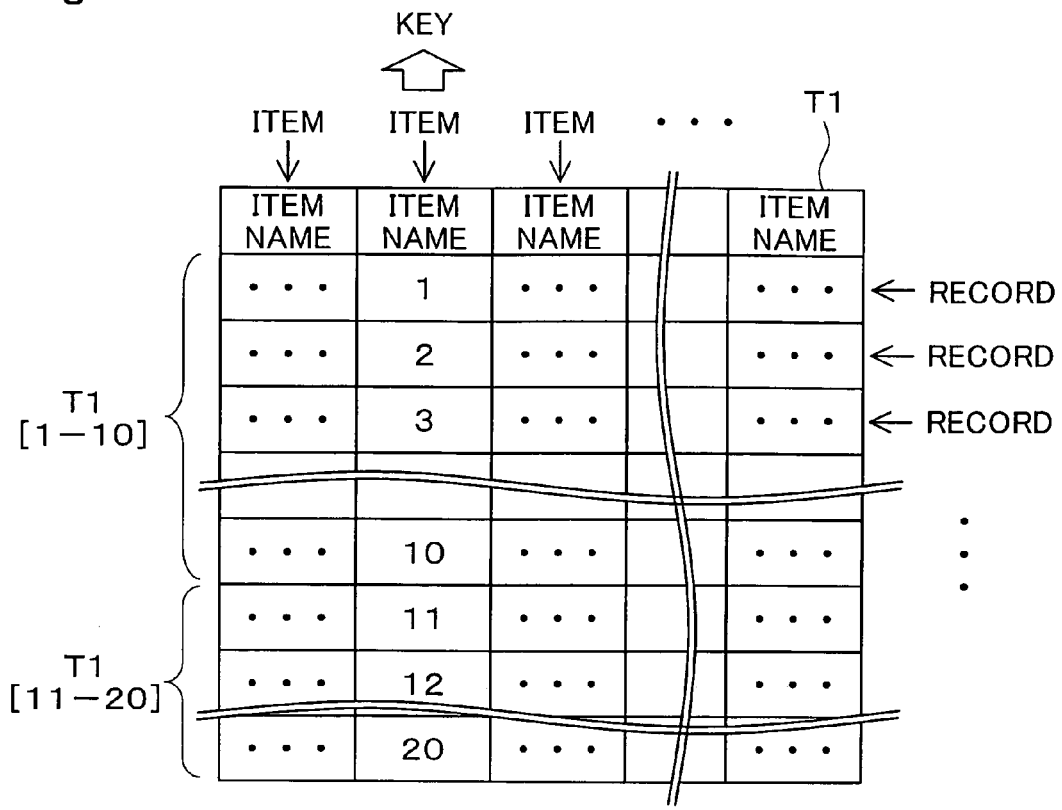
FIG. 4 is an explanatory drawing showing an example of a table as database component information.
FIG. 5 is an explanatory drawing showing an example of a table/disk group correspondence 120.
FIG. 6 is explanatory drawing showing an example of a key value access frequency 130.

An example of a situation in which a table is defined as database component information is described below. FIG. 4 is an explanatory drawing showing an example of a table as database component information. As shown in FIG. 4, a table is a collection of records, and each record comprises multiple items (fields). A specific item in the table is set as a 'key', and the value for the 'key' in each record is referred to as a 'key value'. The key is used as an item to associate multiple tables and indices in a relational database, for example. In this specification, the part of a table T that comprises records falling within the range of key values from (m) to (n) is expressed as 'T [m-n]'. For example, in the table T1, the part comprising records falling within the range of key values 1 through 10 is expressed as 'T1 [1-10]'. In FIG. 4, an example of a table in which the key values are different for each record is shown, but the key values need not be different for each record in the table, and there are cases in which multiple records have the same key value. Furthermore, in the description below, a part of a table that is divided by a range of key values, for examples, is also referred to simply as a 'table'.

In step S100 (FIG. 3), the table/disk group, correspondence obtaining module 111 (FIG. 1) obtains a table/disk group correspondence 120. FIG. 5 is an explanatory drawing showing an example of a table/disk group correspondence 120. As shown in FIG. 5, a table/disk group correspondence 120 is information indicating the relationship between a table and the disk groups that can be used to store this table. In the example of FIG. 5, the tables T1 and T2 handled by the application server 2 (FIG. 2) having the server name 'S1' (such tables expressed as 'S1-T1' and 'S1-T2') can be stored in the disk groups DG1 (expressed as 'D1-DG1') and DG2 (expressed as 'D1-DG2') of the storage device system 3. The table/disk group correspondence 120 is set by the administrator, and is obtained via the input device 15 and network I/F 13 (FIG. 1) or via a recording medium driving device or the like not shown in the drawings. The obtained table/disk group correspondence 120 is stored in the storage device 18 of the management server 1 (FIG. 1).

In step S110 (FIG. 3), the key value-specific access frequency obtaining module 112 of the data allocation module 110 (FIG. 1) obtains a key value-specific access frequency 130. FIG. 6 is an explanatory drawing showing an example of a key value access frequency 130. As shown in FIG. 6, a key value access frequency 130 is information indicating estimated access frequency to a table for a range of key values. Here, 'access frequency' refers to the frequency with which the DBMS 210 (FIG. 1) accesses the table data, and is expressed as a number of accesses per unit of time, for example. In this embodiment, an access frequency is set for each range of key values in the table. In other words, in this embodiment, the table key is used as a reference item for the purposes of setting the access frequency. In this embodiment, as shown in FIG. 6, the key value-specific access frequency 130 is set to vary as time passes. For example, in the example of FIG. 6, the access frequency is set based on units of one day, and the values of such access frequency vary as time passes. Specifically, the access frequency shown in the row in which 'Day 1' is entered in the 'Time' column of FIG. 6 indicate the access frequency for the first day including the time at which the table is first defined, while the access frequency shown in the row in which 'Day 2' is entered in the 'Time' column of FIG. 6 indicate the access frequency for the second day (i.e., from midnight to midnight of the subsequent day). Key value-specific access frequency 130 is set by the administrator, and is obtained via the input device 15 and network I/F 13, or via a recording medium drive device or the like not shown in the drawings. Key value-specific access frequency 130 is stored in the storage device 18 of the management server 1 (FIG. 1).

In step S120 (FIG. 3), the condition obtaining module 113 of the data allocation module 110 (FIG. 1) obtains a data allocation condition. The data allocation condition is an access frequency-related condition that is applied when the allocation of database data is set. The data allocation condition is set by the administrator, and is obtained via the input device 15 (FIG. 1) and the like. In this embodiment, the obtained condition is the condition that 'the difference in access frequency totals between the two disk groups (DG1 and DG2) used for storage of the tables T1 and T2 regarding access to the table data stored in each disk group is smaller than a predetermined threshold value (such as 10, for example)'.

As described above, a disk group area is physically separate from the area of a different disk group. Consequently, a small difference in access frequencies between disk groups means that the physical load attributable to data access in the storage device system 3 is evenly allocated.

In step S130 (FIG. 3), the data allocation module 110 (FIG. 1) sets the data groups. Here, a data group is a collection of table data units that were stored or are to be stored in a disk group. Data group setting is a process that involves setting the same number of data groups as the number of disk groups that can be used for storage of table data and allocating the table divided by key value range to each data group. In this embodiment, because there are two disk groups that can be used for data storage (DG1 and DG2), two data groups are set, and the four tables specified by the key value-specific access frequencies 130 (T1 [1-10], T1 [11-20], T2 [1-10], T2 [11-20]) are allocated to the two data groups. FIG. 7 is an explanatory drawing showing an example of the setting of data groups. As shown in FIG. 7, the four tables are allocated, for example, to the data group 1 (T1 [1-10], T1 [11-20], T2 [1-10]), and the data group 2 (T2 [11-20]).

In step S140 (FIG. 3), the data group load calculation module 114 (FIG. 1) calculates the loads on the data groups set in step S130. The 'load' as defined here is the access frequency total with regard to the table data belonging to a data group. The calculation is carried out based on the key value-specific access frequency 130 (FIG. 6). In FIG. 7, the access frequency for each table and the access frequency calculated for each data group are indicated in parentheses. In the example of FIG. 7, the data groups 1 and 2 each have a total access frequency of 30.

In step S150 (FIG. 3), the condition determination module 115 (FIG. 1) determines whether or not the data group setting performed in step S130 satisfies the data allocation condition obtained in step S120. As described above, in this embodiment, the obtained data allocation condition was the condition that 'the difference between the access frequency totals for the two disk groups is smaller than a predetermined threshold value (such as 10)'. As described above, a data group is a collection of table data units to be stored in a particular disk group. Therefore, the condition determination module 115 determines whether or not the difference between the access frequency totals regarding access of the table data belonging to each data group is smaller than a predetermined threshold value. If the condition determination module 115 determines that the data allocation condition is met, processing advances to step S160 (FIG. 3). If the condition determination module 115 determines that the data allocation condition is not met, on the other hand, processing returns to step S130, and the operations from step S130 (data group setting) to step S150 (data allocation condition determination) are repeated. In the example of FIG. 7, because the difference between the access frequency totals for the data groups 1 and 2 is zero, the condition determination module 115 determines that the data allocation condition is met.

In step S160 (FIG. 3), the data allocation module 110 (FIG. 1) performs disk group and logical device (FIG. 2) allocation, and creates map information 140 (FIG. 1). Disk group allocation is a process in which one disk group is allocated to each of the data groups set in step S130. Logical device allocation is a process in which one logical device belonging to the disk group allocated to a data group is allocated to a table belonging to this data group. FIG. 8 is an explanatory drawing showing an example of disk group and logical device allocation. In the example of FIG. 8, the disk group DG1 is allocated to the data group 1, and the disk group DG2 is allocated to the data group 2. Furthermore, the logical device LD1 belonging to the disk group DG1 is allocated to the table T1 [1-10] belonging to the data group 1, and similarly, the logical device LD2 is allocated to the table T1 [11-20] and the logical device LD3 is allocated to the table T2 [1-10]. The logical device LD4 belonging to the disk group DG2 is allocated to the table T2 [11-20] belonging to the data group 2.

The creation of map information 140 is a process in which map information 140 indicating the correspondences among tables, disk groups and logical devices is created based on the allocation of disk groups and logical devices. FIG. 9 is an explanatory drawing showing an example of map information 140. As shown in FIG. 9, in map information 140, the correspondences among tables divided by key value ranges, disk groups and logical devices are indicated.

In step S170 (FIG. 3), the data allocation module 110 (FIG. 1) carries out data allocation instruction. Data allocation instruction is a process in which the application server 2 (FIG. 1) is instructed to store the table data in accordance with the map information 140 created in step S160. This instruction is transmitted via the network I/Fs (13 and 23). In the application server 2 receiving this data allocation instruction, the logical volume setting module 220 (FIG. 1) creates logical volumes (FIG. 2) and the DBMS 210 (FIG. 1) creates DB areas and DB files (FIG. 2). Here, the application server 2 sets the correspondences among DB areas, DB files, logical volumes and physical volumes such that one physical volume corresponds to one DB area, as shown in FIG. 2. The application server 2 thereafter sends to the storage device system 3 a command to store the data in accordance with the set correspondences. This command is transmitted via the data I/F 29 and the port 31. Upon receiving this data storage command, the storage device system 3 stores the table data in a prescribed storage device 36. In the examples of FIGS. 8 and 9, the data for the table T1 [1-10] is stored in the storage device 36 corresponding to the logical device LD1 (FIG. 2). Similarly, the data for the table T1 [11-20] is stored in the storage device 36 corresponding to the logical device LD2, the data for the table T2 [1-10] is stored in the storage device 36 corresponding to the logical device LD3, and the data for the table T2 [11-20] is stored in the storage device 36 corresponding to the logical device LD4.

As described above, in the computer system 1000 in this embodiment, the management server 1 obtains the key value-specific access frequency 130, and based on this key value-specific access frequency 130, sets the disk groups in which the table data is to be stored. Consequently, in this embodiment, allocation of database data among disk groups can be set taking into account the frequency of access to each disk group as physical storage areas. For example, by setting the difference in the access frequency totals between disk groups to be small, the physical data access load can be equalized across the storage device system 3.

Figures 10, 11:
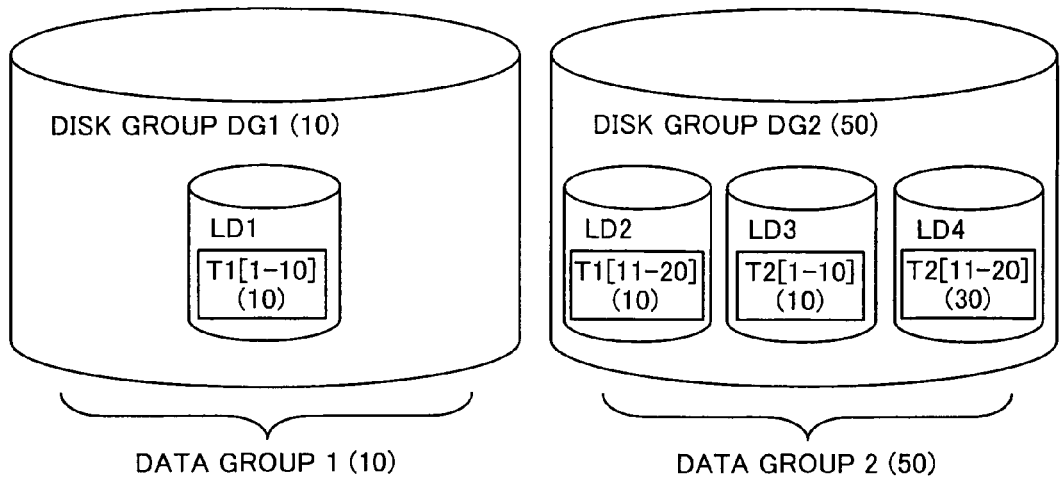
FIG. 10 is an explanatory drawing showing an example of data allocation setting in a variation of the Embodiment 1.
FIG. 11 is an explanatory drawing showing an example of map information 140 in the variation of the Embodiment 1.

FIG. 10 is an explanatory drawing showing an example of data allocation setting in a variation of the Embodiment 1. FIG. 11 is an explanatory drawing showing an example of map information 140 in the variation of the Embodiment 1. This variation of the Embodiment 1 differs from the Embodiment 1 only in regard to the data allocation condition, and the construction of the computer system 1000 (FIG. 1) and the contents of the data allocation process (FIG. 3) are otherwise identical to those in the Embodiment 1.

In this variation of the Embodiment 1, the obtained data allocation condition is the condition that 'regarding the disk group storing the data for the table T1 [1-10], the total of the access frequencies for the data for the tables stored in that disk group is smaller than a predetermined threshold value (such as 10)'. In this case, as a result of the data allocation process (FIG. 3), only the data for the table T1 [1-10] is stored in the disk group DG1, and the remaining three tables (T1 [11-20], T2 [1-10] and T2 [11-20]) are stored in the disk group DG2, as shown in FIGS. 10 and 11.

As described above, in this variation of the Embodiment 1 as well, the computer system 1000 can set the allocation of database data taking into account the disk group access frequencies. For example, regarding a disk group that stores specific database data, the time required to access the specific data can be controlled to fall within a fixed period of time by ensuring that the total of the access frequencies for the data stored in that disk group is smaller than a predetermined threshold value.

B. Embodiment 2

Figure 12:
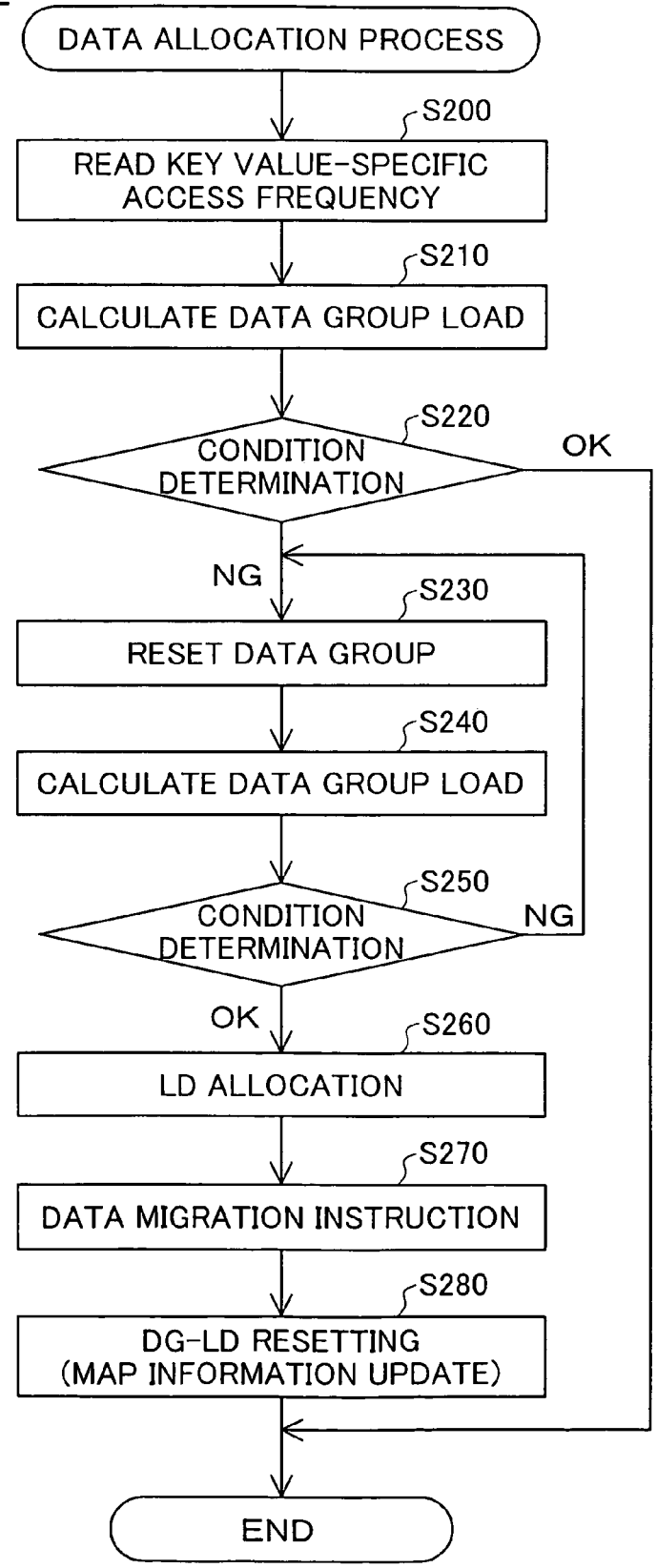
FIG. 12 is a flow chart showing the flow of the data allocation process in Embodiment 2.

FIG. 12 is a flow chart showing the flow of the data allocation process in Embodiment 2. The data allocation process in the Embodiment 2 is a process that, following the setting of table data allocation in the storage device system 3 via the data allocation process in the Embodiment 1 (FIG. 3), resets the allocation of data if any of the values for the key value-specific access frequency 130 (FIG. 6) varies, and is carried out by the data allocation module 110 of the management server 1 (FIG. 1). The data allocation module 110 may begin the data allocation process when any of the values for the key value-specific access frequency 130 has varied, or at a point in time occurring a prescribed period of time prior to such variance. The construction of the computer system 1000 in the Embodiment 2 is identical to the construction of the corresponding system in the Embodiment 1 shown in FIG. 1.

In step S200 (FIG. 12), the data allocation module 110 of the management server 1 (FIG. 1) reads the key value-specific access frequency 130 (FIG. 6). The key value-specific access frequency 130 is obtained during the data allocation process in the Embodiment 1 described above (step S110 in FIG. 3). and is stored in the storage device 18 (FIG. 1). The data allocation module 110 reads the post-variance access frequency values from the stored key value-specific access frequency 130. For example, in this embodiment, the access frequency values where the 'Time' column indicates 'Day 2' are read from the key value-specific access frequency 130 shown in FIG. 6. Alternatively, rather than read the existing key value-specific access frequency 130, the data allocation module 110 may obtain key value-specific access frequency 130 that is newly set by the administrator.

Figure 13:
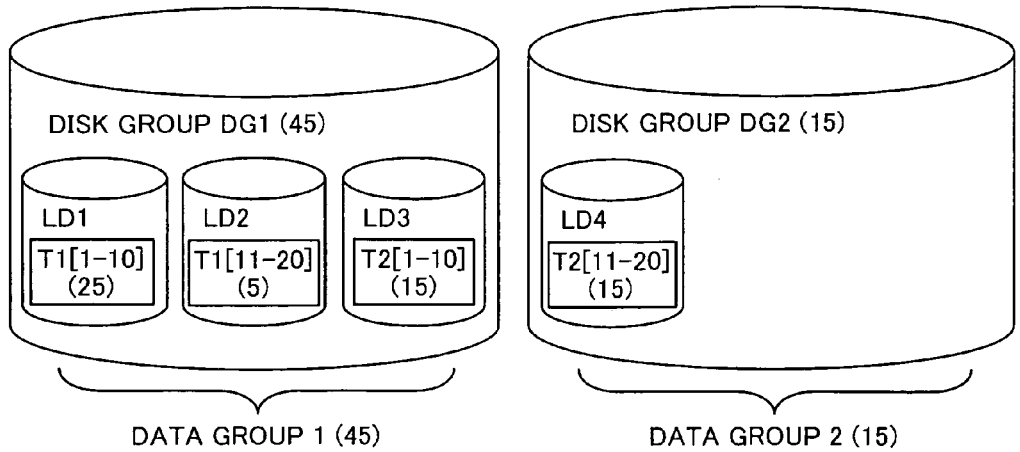
FIG. 13 is an explanatory drawing showing the access frequency totals calculated based on the post-variance key value-specific access frequency 130 at the data allocation process in the Embodiment 2.

In step S210 (FIG. 12), the data group load calculation module 114 (FIG. 1) calculates the loads on the data groups. This data group load calculation operation is identical to the operation of step S140 in the data allocation process in the Embodiment 1 (FIG. 3). That is, the data group load calculation module 114 calculates the access frequency total for each of the currently set data groups based on the post-variance key value-specific access frequency 130 read in step S200. FIG. 13 is an explanatory drawing showing the access frequency totals calculated based on the post-variance key value-specific access frequency 130 at the data allocation process in the Embodiment 2. As shown in FIG. 13, variance in the key value access frequency 130 changes the access frequency total for each data group.

In step S220 (FIG. 12), the condition determination module 115 (FIG. 1) determines whether or not the data allocation condition is satisfied for the set data groups. This determination operation is identical to the operation performed in step S150 of the data allocation process in the Embodiment 1 (FIG. 3). That is, the condition determination module 115 determines whether or not the difference in access frequency totals for the data for the tables belonging to the two different data groups is smaller than a predetermined threshold value (such as 10). If the condition determination module 115 determines that the data allocation condition is satisfied, because there is no need to set the data allocation again, the process ends. If the condition determination module 115 determines that the data allocation condition is not satisfied, on the other hand, processing advances to step S230. In the example shown in FIG. 13, because the difference in the access frequency totals between the data groups is 30, the condition determination module 115 determines that the data allocation condition is not satisfied.

Figure 14:
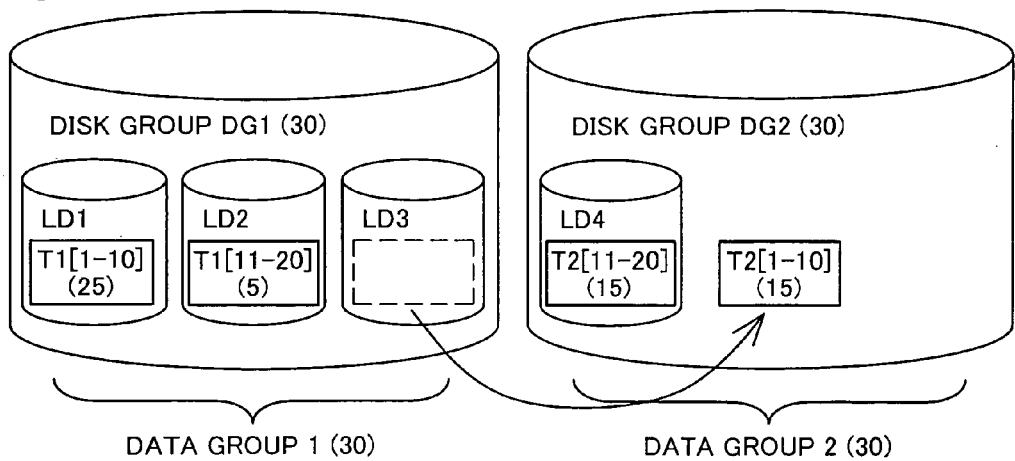
FIG. 14 is an explanatory drawing showing the outline of data group resetting in the data allocation process in the Embodiment 2.

In step S230 (FIG. 12), the data allocation module 110 (FIG. 1) resets the data groups. Data group resetting is a process in which the data groups set during the data allocation process in the Embodiment 1 (FIG. 3) are changed and new data groups are configured. FIG. 14 is an explanatory drawing showing the outline of data group resetting in the data allocation process in the Embodiment 2. In the example of FIG. 14, data group resetting is performed by migrating the table T2 [1-10] from the data group 1 to the data group 2.

In step S240 (FIG. 12), the data group load calculation module 114 (FIG. 1) performs load calculation for the reset data groups. In step S250, the condition determination module 115 (FIG. 1) determines whether or not the data allocation condition is satisfied for the reset data groups. If the condition determination module 115 determines that the data allocation condition is met, processing advances to step S260. If the condition determination module 115 determines that the data allocation condition is not met, on the other hand, processing returns to step S230 and the operations from step S230 (data group resetting) to step S250 (data allocation condition determination) are repeated. In the example of FIG. 14, because the data allocation condition is satisfied following data group resetting, processing advances to step S260.

Figure 15:
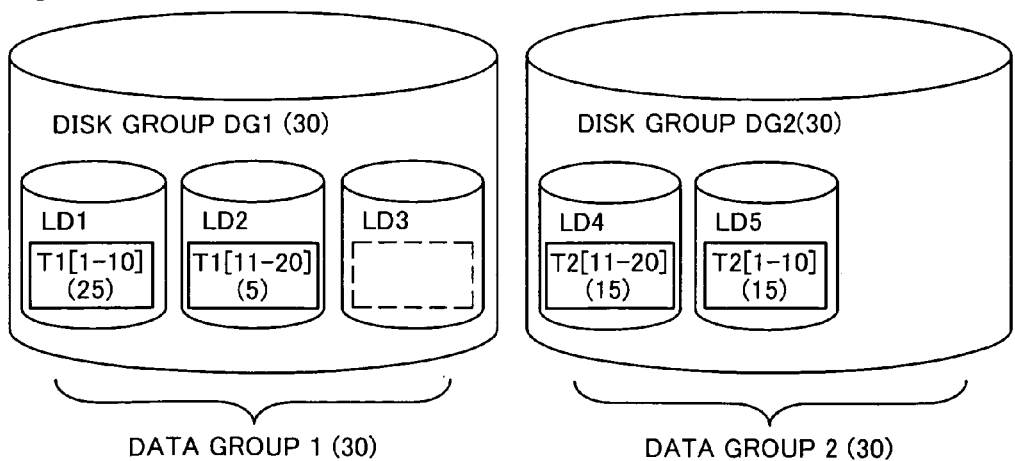
FIG. 15 is an explanatory drawing showing an example of logical device allocation.

In step S260 (FIG. 12), the data allocation module 110 (FIG. 1) performs logical device allocation. Logical device allocation is a process in which, for each table whose data group was changed during the disk group resetting of step S230, a logical device belonging to the disk group corresponding to the changed data group is allocated. FIG. 15 is an explanatory drawing showing an example of logical device allocation. In the example of FIG. 15, the table T2 [1-10] was migrated from the data group 1 to the data group 2. Consequently, a logical device LD5 that is a logical device belonging to the disk group DG2 corresponding to the data group 2 is allocated to the table T2 [1-10].

In step S270 (FIG. 12), the data allocation module 110 (FIG. 1) instructs that data migration be carried out. Data migration instruction is a process in which the application server 2 (FIG. 1) is instructed to migrate within the storage device system 3 the data for each table for which logical device allocation was carried out in step S260. Here, migration of table data within the storage device system 3 means migration from the storage device 36 corresponding to the logical device prior to the variance of data group (the logical device LD3 in the example of FIG. 15) to the storage device 36 corresponding to the logical device after such variance (the logical device LD5 in the example of FIG. 15). On the application server 2 receiving a data migration instruction, the DBMS 210 (FIG. 1) sends a data migration command to the storage device system 3. In the storage device system 3 receiving this command, the data migration module 320 (FIG. 1) executes the data migration process. As a result of this process, the data for the table T2 [1-10] is physically migrated to the storage device 36 belonging to the disk group DG2.

Figure 16:
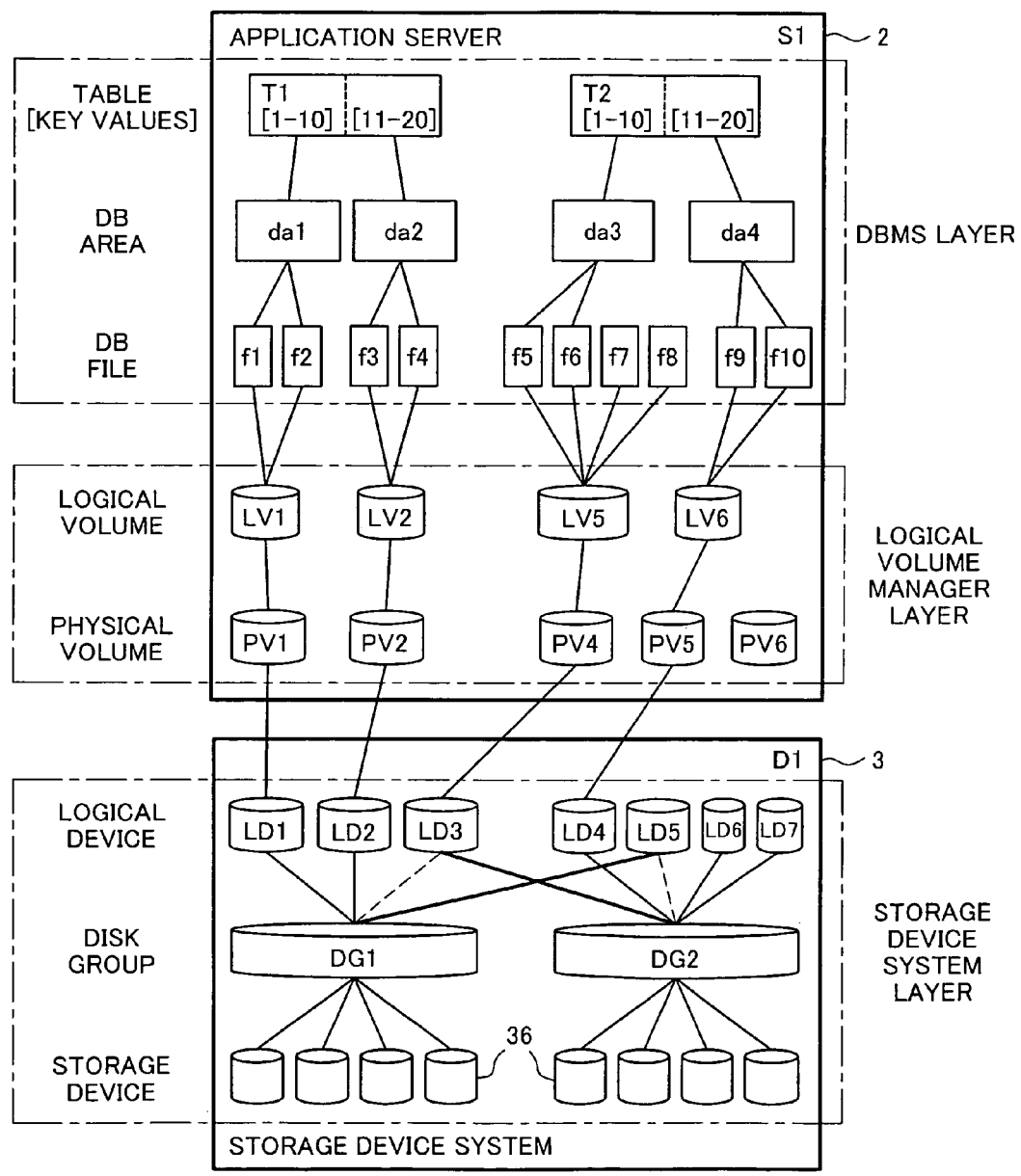
FIG. 16 is an explanatory drawing showing an example of resetting of correspondences between disk groups and logical devices.

In step S280 (FIG. 12), the data allocation module 110 (FIG. 1) resets the correspondences between the disk groups and the logical devices and updates the map information 140 (FIG. 1). FIG. 16 is an explanatory drawing showing an example of resetting of correspondences between disk groups and logical devices. As shown in FIG. 16, the resetting of correspondences between disk groups and logical devices is carried out by switching the logical device that stored the table migrated in step S270 prior to such migration (in FIG. 16, the logical device LD3) with the logical device that stores the migrated table after the migration (in FIG. 16, the logical device LD5). That is, the pre-migration logical device LD3 is associated with the disk group DG2 associated with the post-migration logical device LD5, and the post-migration logical device LD5 is associated with the disk group DG1 associated with the pre-migration logical device LD3. As a result of this resetting, the application server 2 can access the data for the table T2 [1-10] whose storage position within the storage device system 3 has changed by accessing the same logical device LD3 used prior to table data migration. FIG. 17 is an explanatory drawing showing the allocation of tables after the correspondences between disk groups and logical devices are reset. FIG. 18 is an explanatory drawing showing an example of map information 140 created after the correspondences between disk groups and logical devices are reset. The table T2 [1-10] whose storage position within the storage device system 3 was changed is now stored in the logical device LD3 belonging to the disk group DG2.

In this embodiment, if any of the values for the key value access frequency 130 (FIG. 6) varies once more, the data allocation process shown in FIG. 12 is executed once again.

As described above, in the computer system 1000 in the Embodiment 2, if any of the values of the key value-specific access frequency 130 varies, the management server 1 can set the disk groups to store the table data based on the post-variance key value-specific access frequency 130. Consequently, in the computer system 1000 in the Embodiment 2, the allocation of database data among disk groups can be set taking into account disk group access frequencies that vary with the passage of time. For example, the physical data access loads within the storage device system 3 can be equalized throughout the period during which a database is used.

Figures 20, 21A, 21B, 22:
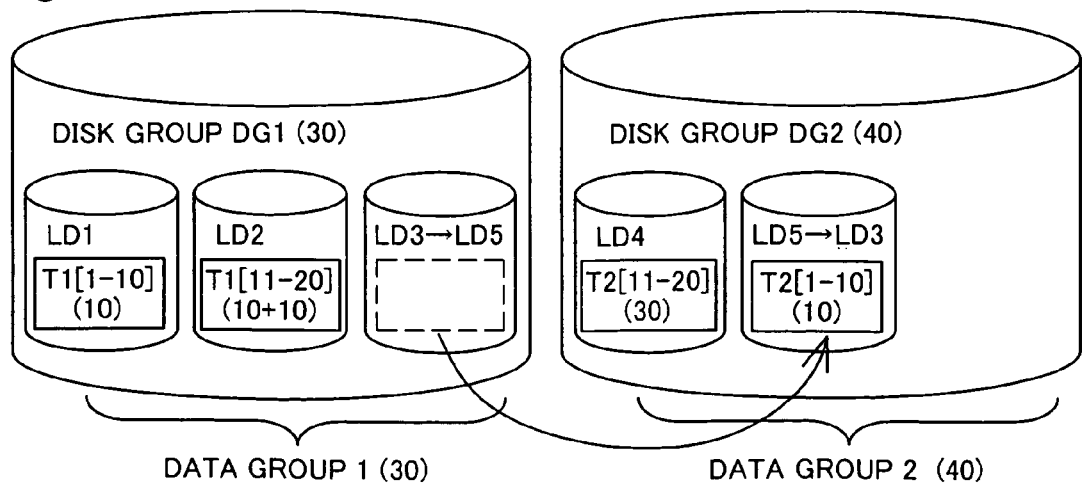
FIG. 20 is an explanatory drawing showing an example of map information 140 in this variation of the Embodiment 2.
FIGS. 21A and 21B are explanatory drawings showing an example of key value-specific access frequency 130 in Embodiment 3.
FIG. 22 is an explanatory drawing showing an example of data allocation setting in the Embodiment 3.

FIG. 19 is an explanatory drawing showing an example of data allocation setting in a variation of the Embodiment 2. FIG. 20 is an explanatory drawing showing an example of map information 140 in this variation of the Embodiment 2. This variation of the Embodiment 2 differs from the Embodiment 2 only in regard to the data allocation condition, and the construction of the computer system 1000 (FIG. 1) and the contents of the data allocation process (FIG. 12) are otherwise identical to the corresponding construction and process in the Embodiment 2.

In the variation of the Embodiment 2, the obtained data allocation condition is the condition that 'regarding the disk group storing the data for the table T1 [11-20], the total of the access frequencies for the table data stored in that disk group is smaller than a predetermined threshold value (such as 10)'. In this case, as a result of the data allocation process (FIG. 12), only the data for the table T1 [11-20] remains in the disk group DG1, and the remaining two tables (T1 [1-10] and T2 [1-10]) are migrated to the disk group DG2, as shown in FIGS. 19 and 20. In the logical device diagram of FIG. 19, the names of the logical devices prior to resetting in step S280 of the data allocation process (FIG. 12) are shown together with the logical devices names after resetting.

Accordingly, in this variation of the Embodiment 2 as well, the computer system 1000 can set the allocation of database data while taking into account disk group access frequencies. For example, the time required for accessing specific data can be controlled to fall within a specific time period throughout the period during which a database is used.

C. Embodiment 3

FIGS. 21A and 21B are explanatory drawings showing an example of key value-specific access frequency 130 in Embodiment 3. The Embodiment 3 differs from the Embodiment 2 only in regard to the key value-specific access frequency 130 and the timing at which the data allocation process is performed, and the construction of the computer system 1000 (FIG. 1) and the contents of the data allocation process (FIG. 12) are otherwise identical to the corresponding construction and process in the Embodiment 2.

The key value-specific access frequency 130 in the Embodiment 3 include an access frequency 130a set separately for each key value range in the table shown in FIG. 21A as well as an access frequency 130b estimated for data newly added to the data for the table shown in FIG. 21B. In the example of FIGS. 21A and 21B, when the 'Time' becomes 'Day 2', new data is added to the data for table T1 [11-20] and the access frequency for this added data is '10'.

In addition, in the Embodiment 3, when data is newly added to the table data, the data allocation process is executed once more. In the example of FIGS. 21A and 21B, the data allocation process is executed when the 'Time' becomes 'Day 2'. The data allocation process may be begun when the data is newly added to the table, or at a point occurring a prescribed period of time before the data is newly added to the table.

In the data allocation process in the Embodiment 3, the access frequency 130b for the added data shown in FIG. 21B is also read when the key value-specific access frequency is read in step S200 (FIG. 12). Thereafter in step S210, data group load calculation that takes into consideration the access frequency for the added data is carried out, and in step 220, data allocation condition determination is performed. In the Embodiment 3, the obtained condition is the condition that 'regarding the disk group storing the data for the table T1 [1-10], the total of the access frequencies for the data for the tables stored in that disk group is smaller than a predetermined threshold value (such as 30)'.

In the Embodiment 3, when data is newly added to the table data, the total of the access frequencies regarding the disk group DG1 in which the table T1 [1-10] is stored equals 40, which includes the access frequency for the new data. As a result, it is determined in step S220 (FIG. 12) that the data allocation condition is not satisfied. Consequently, the operations beginning with step S230 (data group resetting) of the data allocation process (FIG. 12) are carried out.

Figures 23, 24, 25:
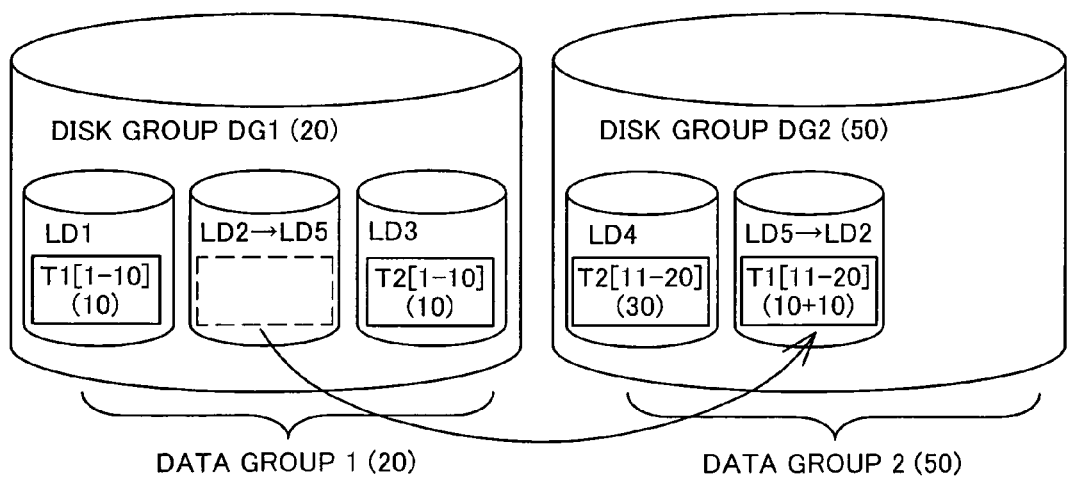
FIG. 23 is an explanatory drawing showing an example of map information 140 in the Embodiment 3.
FIG. 24 is an explanatory drawing showing an example of data allocation setting in a variation of the Embodiment 3.
FIG. 25 is an explanatory drawing showing an example of map information 140 in this variation of the Embodiment 3.

FIG. 22 is an explanatory drawing showing an example of data allocation setting in the Embodiment 3. FIG. 23 is an explanatory drawing showing an example of map information 140 in the Embodiment 3. In the Embodiment 3, as shown in FIGS. 22 and 23, the data for the table T2 [1-10] stored in the disk group DG1 is migrated to the disk group DG2 through the operations beginning with step S230. As a result of this data allocation setting, the above data allocation condition becomes satisfied.

As described above, in the computer system 1000 in the Embodiment 3, when new data is added to the database data, the management server 1 can set the disk groups in which the table data is to be stored while also taking into account the key value-specific access frequency for the added data. Consequently, in the computer system 1000 in the Embodiment 3, the allocation of the database data among disk groups can be set taking into account the disk group access frequencies even when new data is added to the database data.

FIG. 24 is an explanatory drawing showing an example of data allocation setting in a variation of the Embodiment 3. FIG. 25 is an explanatory drawing showing an example of map information 140 in this variation of the Embodiment 3. This variation of the Embodiment 3 differs from the Embodiment 3 only in regard to the data allocation condition, and the construction of the computer system 1000 (FIG. 12), the contents of the data allocation process (FIG. 12) and the key value access frequency 130 (FIG. 21) are otherwise identical to those in the Embodiment 3.

In this variation of the Embodiment 3, the obtained data allocation condition is the condition that 'regarding the disk group storing the data for the table T1 [1-10], the total of the access frequencies for the data for the tables stored in that disk group is smaller than a predetermined threshold value (such as 20)'. In this case, as a result of the data allocation process (FIG. 12), the table T1 [11-20] stored in the disk group DG1 is migrated to the disk group DG2, as shown in FIGS. 24 and 25. The data added to the T1 [11-20] is also stored in the disk group DG2.

In this way, using the computer system 1000 in this variation of the Embodiment 3 as well, when new data is added to the database data, the allocation of the database data among disk groups can be set taking into account the access frequencies for those disk groups.

D. Embodiment 4

Figure 26:
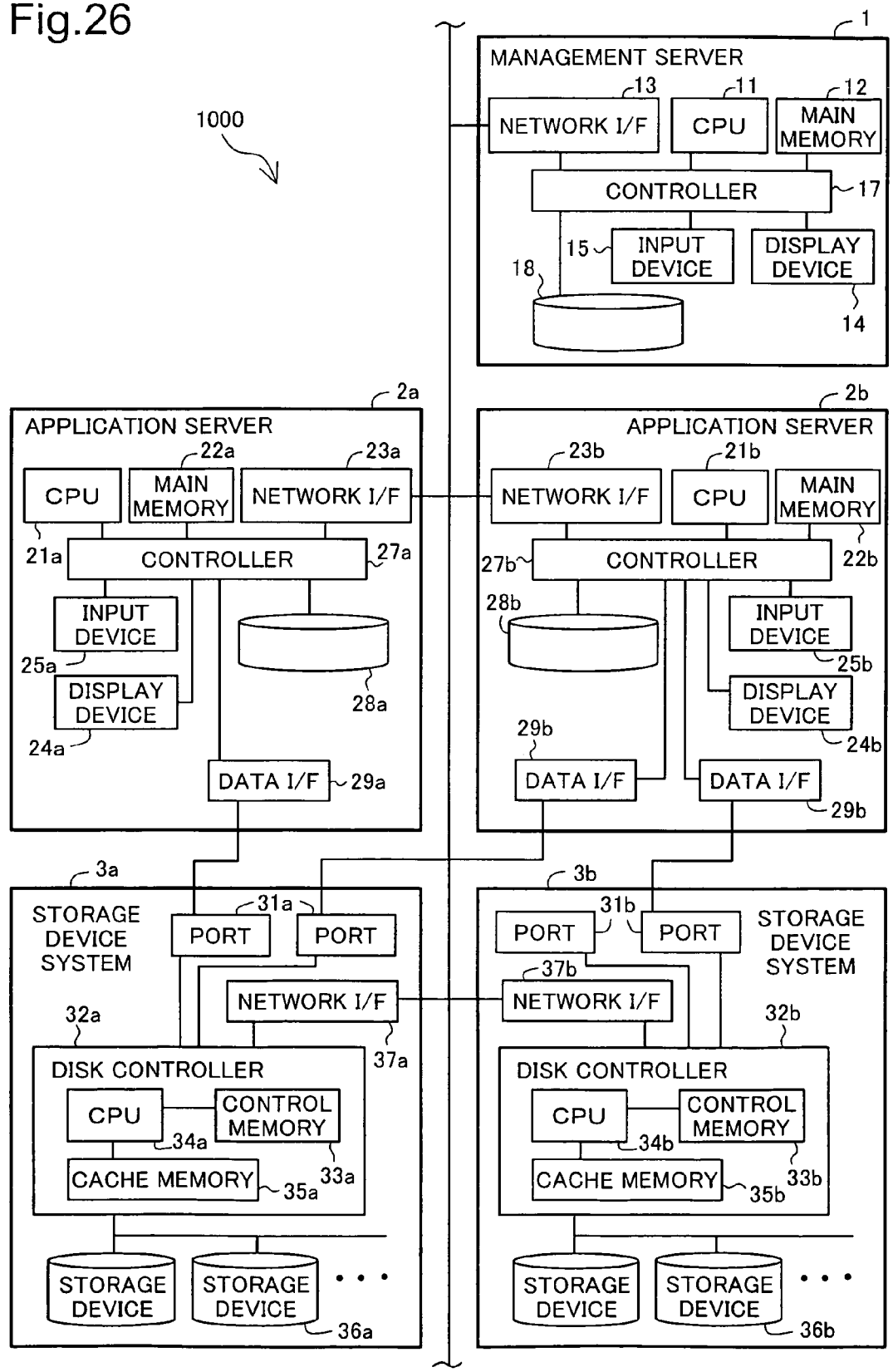
FIG. 26 is a block diagram showing construction of a computer system 1000 in Embodiment 4.

FIG. 26 is a block diagram showing construction of a computer system 1000 in Embodiment 4. It differs from the computer system 1000 in the Embodiment 1 in that, while the computer system 1000 in the Embodiment 1 includes a single application server 2 and a single storage device system 3, the computer system 1000 in the Embodiment 4 includes two application servers 2 (2a and 2b) and two storage device systems 3 (3a and 3b). The management server 1, application servers 2 and storage device systems 3 have the same internal constructions in the Embodiment 1 shown in FIG. 1, and parts thereof are omitted in FIG. 26.

In the computer system 1000 in the Embodiment 4, the management server 1, the two application servers 2 and the two storage device systems 3 are interconnected by a network I/F possessed by each (13, 23a, 23b, 37a, 37b, respectively). The application server 2a is connected directly to the storage device system 3a via a data I/F 29a. In addition, the application server 2b is directly connected to the storage device systems 3a and 3b via a data I/F 29b.

Figure 27:
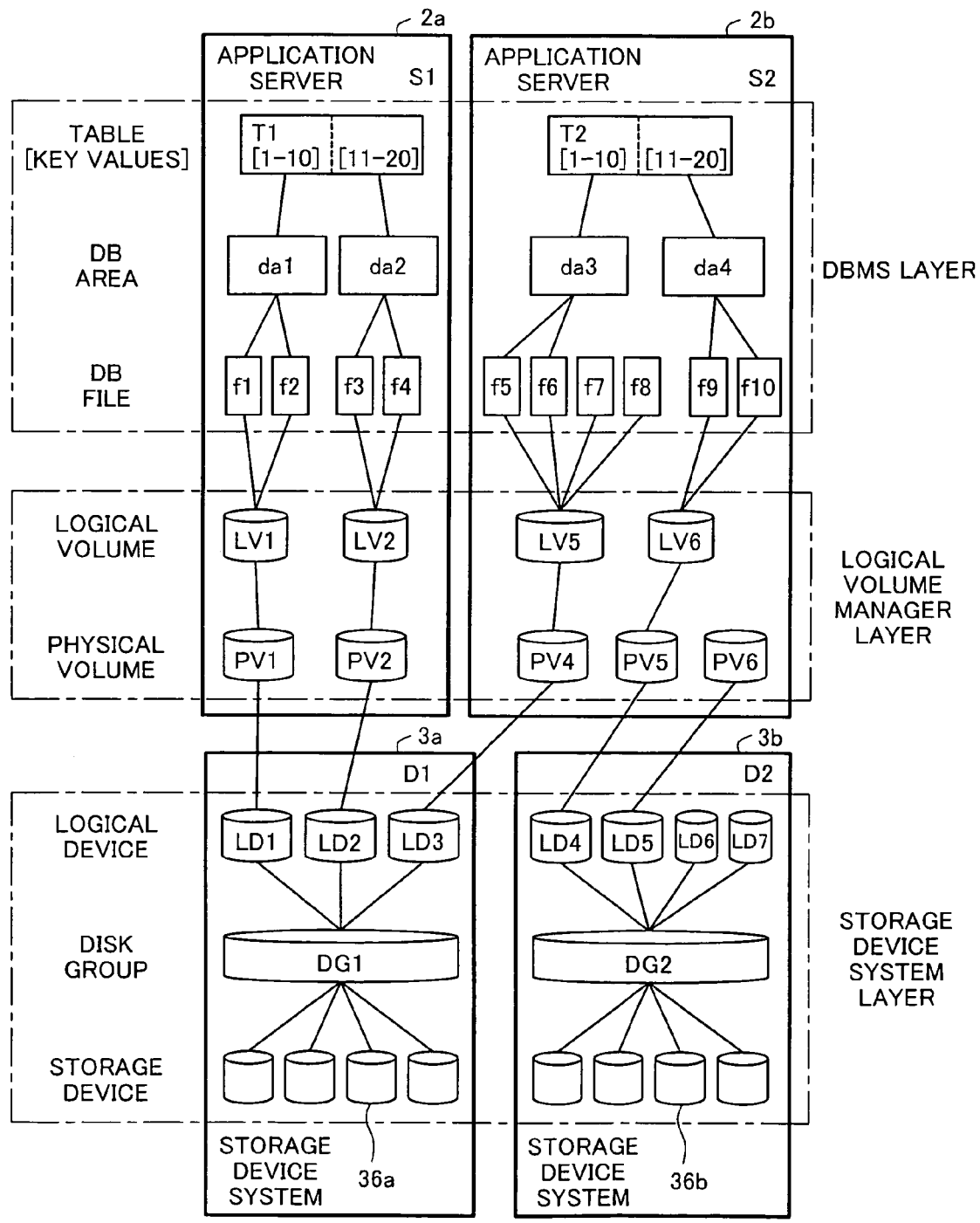
FIG. 27 is a block diagram showing conceptually the hierarchical structure of the allocation of database data in the computer system 1000 in the Embodiment 4.

FIG. 27 is a block diagram showing conceptually the hierarchical structure of the allocation of database data in the computer system 1000 in the Embodiment 4. The Embodiment 4 shown in FIG. 27 differs from the Embodiment 1 shown in FIG. 2 in that the hierarchical structure of the data allocation is divided into the two application servers 2 and the two storage device systems 3, but otherwise the two embodiments are identical. As shown in FIG. 27, in the Embodiment 4, the disk groups DG1 and DG2 belong to different storage device systems 3. In the Embodiment 4, the server name of the application server 2a is set as 'S1', and similarly, the server name of the application server 2b is set as 'S2', the system name of the storage device system 3a is set as 'D1' and the system name of the storage device system 3b is set as 'D2'.

Figure 28:
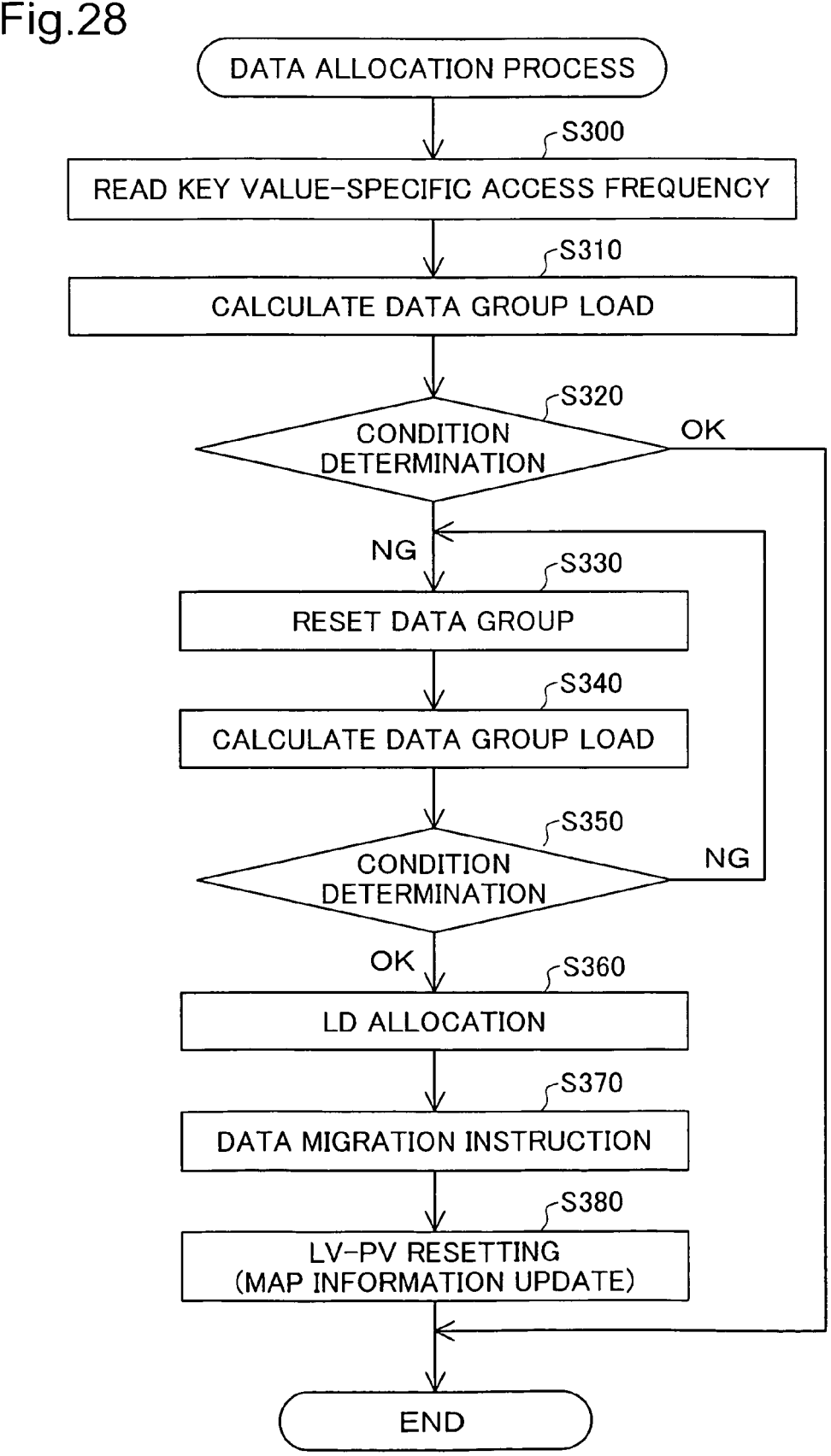
FIG. 28 is a flow chart showing the flow of the data allocation process in Embodiment 4.

FIG. 28 is a flow chart showing the flow of the data allocation process in Embodiment 4. In the data allocation process of the Embodiment 4, as in the data allocation process of the Embodiment 2 shown in FIG. 12, when any of the values of the key value-specific access frequency 130 varies, the allocation of the data is set once again. That is, when the DBMS 210 (FIG. 1) defines tables, a process identical to the data allocation process in the Embodiment 1 shown in FIG. 3 (termed the 'initial allocation process' below) is performed prior to the data allocation process in the Embodiment 4.

FIG. 29 is an explanatory drawing showing an example of table/disk group correspondence 120 obtained during the initial allocation process. FIG. 30 is an explanatory drawing showing an example of key value-specific access frequency 130 obtained during the initial allocation process. The table/ disk group correspondence 12 and the key value access frequency 130 are identical to those obtained in the Embodiment 1 and shown in FIGS. 5 and 6. FIG. 31 is an explanatory drawing showing an example of map information 140 after the initial allocation process is completed. As a result of the initial allocation process, the three tables T1 [1-10], T1 [11-20] and T2 [1-10] are stored in the disk group DG1, and the table T2 [11-20] is stored in the disk group DG2. That is, the table data is allocated as shown in FIG. 27. The map information 140 in the Embodiment 4 shown in FIG. 31 differs from the map information 140 shown in the Embodiments 1 to 3 in that it includes the items 'logical volume' and 'physical volume' (FIG. 27).

In the data allocation process in the Embodiment 4 (FIG. 28), the operations from step S300 to step S370 are identical to the operations from step S200 to step S270 of the data allocation process in the Embodiment 2 shown in FIG. 12. That is, through the operations from step S300 to step S370, the table T2 [1-10] is migrated from the disk group DG1 to the disk group DG2, as shown in FIG. 15. Here, the migration of the table T2 [1-10] is carried out between different storage device systems 3. This migration process is executed by the data migration module 320 (FIG. 1) of the migration source storage device system 3 (FIG. 1).

In step S380 (FIG. 28), the data allocation module 110 (FIG. 1) resets the correspondences between logical volumes and physical volumes and updates the map information 140 (FIG. 31). Here, while the correspondences between disk groups and logical devices are reset in step S280 of the Embodiment 2 shown in FIG. 12, in the Embodiment 4, the correspondences between logical volumes and physical volumes are reset. The reason for this is that because the disk groups DG1 and DG2 are included in different storage device systems 3 in the Embodiment 4, the correspondences between disk groups and logical devices cannot be reset.

Figure 32:
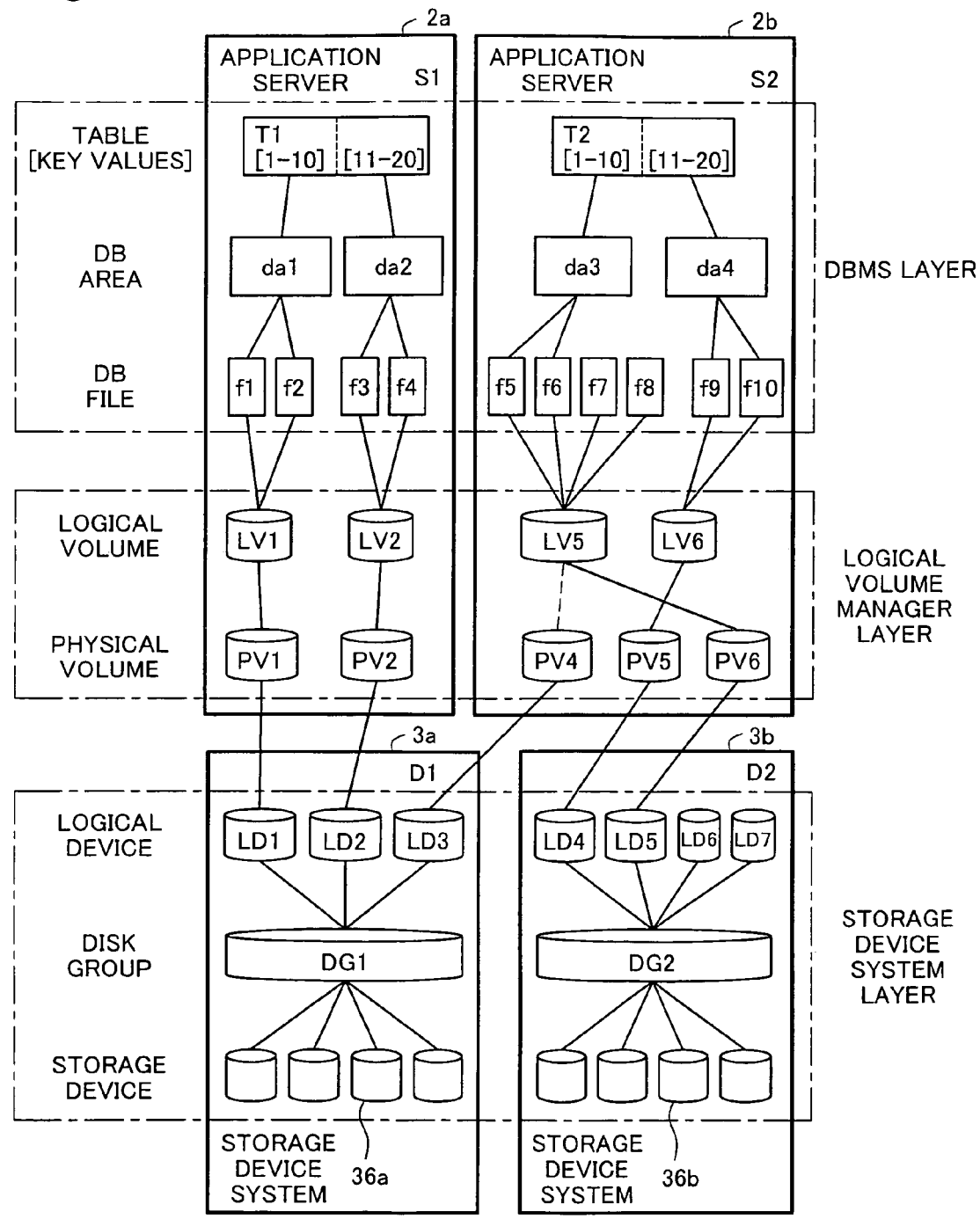
FIG. 32 is an explanatory drawing showing an example of the resetting of the correspondences between logical volumes and physical volumes.

FIG. 32 is an explanatory drawing showing an example of the resetting of the correspondences between logical volumes and physical volumes. As shown in FIG. 32, the resetting of the correspondences between logical volumes and physical volumes involves switching the physical volume PV4 associated with the logical device LD3 in which the table T2 [1-10] was stored prior to migration with the physical volume PV6 associated with the logical device LD5 in which the table is stored after migration. That is, the correspondence between the physical volume PV4 and the logical volume LV5 is changed to an correspondence between the physical volume PV6 and the logical volume LV5. As a result of this correspondence resetting, the DBMS 210 (FIG. 1) can access the data for the table T2 [1-10] having a changed storage position in the storage device systems 3 by accessing the same logical volume LV5 on which the data resided before migration.

Figure 33:
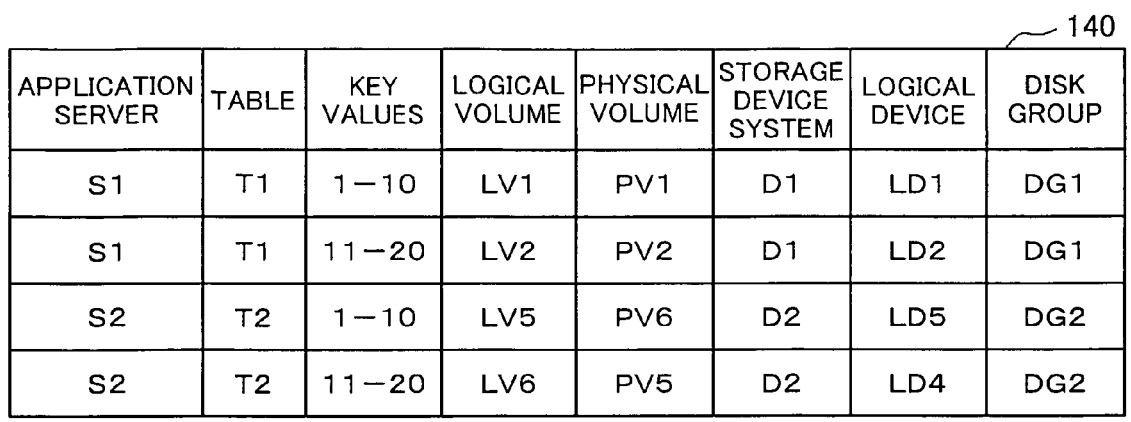
FIG. 33 is an explanatory drawing showing an example of map information 140 created after resetting of correspondence between logical volume and physical volume.

FIG. 33 is an explanatory drawing showing an example of map information 140 created after resetting of correspondence between logical volume and physical volume. As shown in FIG. 33, the table T2 [1-10] having a changed storage position within the storage device systems 3 is stored in the logical device LD5 belonging to the disk group DG2.

As described above, in the Embodiment 4, even in a computer system 1000 that includes multiple application servers 2 and multiple storage device systems 3, the management server 1 can set the disk groups in which the table data is to be stored based on key value-specific access frequency 130. Consequently, even in a computer system 1000 that includes multiple application servers 2 and multiple storage device systems 3, the allocation of database data among disk groups can be set taking into account the access frequencies for those disk groups.

E. Variations

The present invention is not limited to the embodiments and aspects described above. The present invention may be worked in various aspects within limits that involve no departure from the spirit of the invention; for example, the following variations are possible.

E1. Variation 1

The constructions of the computer systems 1000 of the various embodiments shown in FIGS. 1 and 26 are merely examples, and other constructions of the computer system 1000 may be employed. The computer system 1000 may include three or more application servers 2, or three or more storage device systems 3. The application server 2 may be integrated with the management server 1 as a single computer. Alternatively, the application server 2 may be integrated with the storage device system 3 as a single unit.

Furthermore, the hierarchical constructions used for the allocation of database data in the computer systems 1000 of the various embodiments shown in FIGS. 2 and 27 are merely examples, and other hierarchical constructions may be used. For example, disk groups need not be defined as physical storage areas in the storage device system 3. In this case, the data allocation module 110 of the management server 1 may set the allocation of database data among storage devices 36 as physical storage areas. That is, the 'physical storage area' of the present invention may be a unit component of physical storage areas (such as storage device 36), or a collection of the unit components of physical storage areas (such as disk group).

E2. Variation 2

In the above embodiments, the access frequency was set for each range of key values in a table, and the key value ranges may be freely set. For example, the key value range may comprise a single value such that the access frequency may be set to have a one-to-one correlation with key values.

The access frequency may be set for each range of values of a reference item other than the key item among the table items (FIG. 4). An access frequency may be set for each record (FIG. 4) within a table.

In the above embodiments, the access frequency was set in terms of days, but they may be set in terms of some other unit of time (i.e., minutes, hours, weeks, months or years). The access frequency need not be set to vary over time, and may be fixed.

E3. Variation 3

The table/disk group correspondence 120, key value-specific access frequency 130 and map information 140 described in connection with the above embodiments were merely examples, and these types of information may include other information or partially exclude the information contained therein in the current examples.

E4. Variation 4

In the above embodiments, tables were used as an example of component information composing the database, but the component information may be one or more indices or other type of information.

What is claimed is:

1. A computer for use in a computer system including said computer and a storage system having at least one storage device including multiple physical storage areas for storing a database having database data, the database data of the database including component information having a reference item having plural value ranges, the database data being dividable according to value ranges of the reference item, the computer comprising:
 a database management system (DBMS) for managing said database;
 an access frequency obtaining module configured to obtain, for each value range of the reference item in the component information, an estimated access frequency for data of the component information by said DBMS; and a data allocation module configured to perform a process of data allocation to allocate, based on the obtained estimated access frequency, data of the component information divided according to the value ranges of the reference item to the physical storage areas to be stored, wherein each value range of the reference item corresponds to a database area defined and managed by said DBMS, and wherein the process of data allocation includes:

obtaining a table/disk group correspondence which is information indicating a relationship between a table and disk groups including the physical storage areas that can be used to store the table, obtaining a key value-specific access frequency which is information indicating estimated access frequency to a table for a range of key values, obtaining a data allocation condition which is an access frequency-related condition that is applied when the allocation of database data is set, said data allocation condition is set by the administrator, setting data groups each being a collection of table data stored in a disk group, wherein the setting includes:

setting the same number of data groups as the number of disk groups that can be used for storage of table data and allocating the table divided by key value range to each data group, calculating loads on the data groups set in the setting step, wherein a load is defined as an access frequency total with regard to the table data belonging to a data group and the calculation is performed based on the obtained key value-specific access frequency, determines whether the setting of data groups in the setting step satisfies the obtained data allocation condition, if the setting of the data groups in the setting step does not satisfy the obtained data allocation condition, then conducting again the setting and calculating steps, if the setting of the data groups in the setting step does satisfy the obtained data allocation condition, then performing disk group allocation and creating map information, wherein disk group allocation is a process in which one disk group is allocated to each of the data groups set in the setting steps, and carrying out a data allocation instruction which is a process in which the DBMS is instructed to store the table data in accordance with the map information created in the performing step.

2. A computer according to claim 1, wherein the physical storage areas are included in a storage device system included in the computer system.

3. A computer according to claim 1, wherein the database includes multiple component information, the component information includes multiple records including multiple items, and the reference item is a specific item among the multiple items that is included in each of the multiple component information in common.

4. A computer according to claim 1, wherein the data allocation module includes an allocation condition obtaining module that obtains the predetermined condition set by an administrator.

5. A computer according to claim 4, wherein the data allocation condition is a condition that a difference in the total estimated access frequency among the physical storage areas included in the computer system is smaller than a predetermined threshold value.

6. A computer according to claim 4, wherein the data allocation condition is a condition that, regarding a certain physical storage area storing specific data among the physical storage areas included in the computer system, the total estimated access frequency is smaller than a predetermined threshold value.

7. A computer according to claim 1, wherein the estimated access frequency is set to vary as time passes, and when the estimated access frequency value varies the data allocation module allocates the divided data of the component information to the physical storage areas to be stored.

8. A computer according to claim 1, wherein the estimated access frequency includes an access frequency estimated for data newly added to the data of the component information, and when data is to be newly added to the data of the component information the access frequency obtaining module obtains the estimated access frequency and the data allocation module reallocates the divided data of the component information to the physical storage areas to be stored.

9. A computer according to claim 1, wherein the computer system includes an application computer that runs the database, and after allocating the divided data of the component information to the physical storage areas to be stored, the data allocation module instructs the application computer to store the divided data of the component information based on the allocating.

10. A method of allocating database data in a computer system, the computer system including a computer and a storage system having at least one storage device including multiple physical storage areas for storing a database having the database data, the database including component information having a reference item having plural value ranges, the database data being dividable according to value ranges of the reference item, the method comprising the steps of:

(a) managing, a database management system (DBMS), said database;

(b) obtaining, for each value range of the reference item in the component information, an estimated access frequency for data of the component information; and (c) allocating, based on the obtained estimated access frequency, data of the component information divided according to the value ranges of the reference item to the physical storage areas to be stored, wherein each value range of the reference item corresponds to a database area defined and managed by said DBMS, and wherein the allocating step includes:

obtaining a table/disk group correspondence which is information indicating a relationship between a table and disk groups including the physical storage areas that can be used to store the table, obtaining a key value-specific access frequency which is information indicating estimated access frequency to a table for a range of key values, obtaining a data allocation condition which is an access frequency-related condition that is applied when the allocation of database data is set, said data allocation condition is set by the administrator, setting data groups each being a collection of table data stored in a disk group, wherein the setting includes:

setting the same number of data groups as the number of disk groups that can be used for storage of table data and allocating the table divided by key value range to each data group, calculating loads on the data groups set in the setting step, wherein a load is defined as an access frequency total with regard to the table data belonging to a data group and the calculation is performed based on the obtained key value-specific access frequency, determines whether the setting of data groups in the setting step satisfies the obtained data allocation condition, if the setting of the data groups in the setting step does not satisfy the obtained data allocation condition, then conducting again the setting and calculating steps, if the setting of the data groups in the setting step does satisfy the obtained data allocation condition, then performing disk group allocation and creating map information, wherein disk group allocation is a process in which one disk group is allocated to each of the data groups set in the setting steps, and carrying out a data allocation instruction which is a process in which the DBMS is instructed to store the table data in accordance with the map information created in the performing step.

11. A computer program product for allocating database data in a computer system using a computer for use in the computer system, the computer system including said computer and a storage system having at least one storage device including multiple physical storage areas for storing a database having the database data, the database including component information having a reference item having plural value ranges, the database data being dividable according to value ranges of the reference item, the computer program product comprising:

a computer readable medium; and a computer program, executed by said computer system, stored on the computer readable medium, the computer program comprising:

a database management system (DBMS) for managing said database;

a first program for causing the computer to obtain, for each value range of the reference item in the component information, an estimated access frequency for data of the component information; and a second program for causing the computer to perform a process of data allocation to allocate, based on the obtained estimated access frequency, data of the component information divided according to the value ranges of the reference item to the physical storage areas to be stored, wherein each value range of the reference item corresponds to a database area defined and managed by said DBMS, and wherein the process of data allocation includes:

obtaining a table/disk group correspondence which is information indicating a relationship between a table and disk groups including the physical storage areas that can be used to store the table, obtaining a key value-specific access frequency which is information indicating estimated access frequency to a table for a range of key values, obtaining a data allocation condition which is an access frequency-related condition that is applied when the allocation of database data is set, said data allocation condition is set by the administrator, setting data groups each being a collection of table data stored in a disk group, wherein the setting includes setting the same number of data groups as the number of disk groups that can be used for storage of table data and allocating the table divided by key value range to each data group, calculating loads on the data groups set in the setting step, wherein a load is defined as an access frequency total with regard to the table data belonging to a data group and the calculation is performed based on the obtained key value-specific access frequency, determines whether the setting of data groups in the setting step satisfies the obtained data allocation condition, if the setting of the data groups in the setting step does not satisfy the obtained data allocation condition, then conducting again the setting and calculating steps, if the setting of the data groups in the setting step does satisfy the obtained data allocation condition, then performing disk group allocation and creating map information, wherein disk group allocation is a process in which one disk group is allocated to each of the data groups set in the setting steps, and carrying out a data allocation instruction which is a process in which the DBMS is instructed to store the table data in accordance with the map information created in the performing step.

12. A computer system comprising:

a storage device system including a physical storage area for storing database data; and a computer that allocates the data in the computer system, wherein the computer system includes said computer and a storage system having at least one storage device including multiple physical storage areas, the database includes component information having a reference item having plural value ranges, the database data is dividable according to value ranges of the reference item, and wherein the computer includes:

a database management system (DBMS) for managing said database, an access frequency obtaining module configured to obtain, for each value range of the reference item in the component information, an estimated access frequency for data of the component information, and a data allocation module configured to perform a process of data allocation to allocate, based on the obtained estimated access frequency, data of the component information divided according to the value ranges of the reference item to the physical storage areas to be stored, wherein each value range of the reference item corresponds to a database area defined and managed by said DBMS, and wherein the process of data allocation includes:

obtaining a table/disk group correspondence which is information indicating a relationship between a table and disk groups including the physical storage areas that can be used to store the table, obtaining a key value-specific access frequency which is information indicating estimated access frequency to a table for a range of key values, obtaining a data allocation condition which is an access frequency-related condition that is applied when the allocation of database data is set, said data allocation condition is set by the administrator, setting data groups each being a collection of table data stored in a disk group, wherein the setting includes:

setting the same number of data groups as the number of disk groups that can be used for storage of table data and allocating the table divided by key value range to each data group, calculating loads on the data groups set in the setting step, wherein a load is defined as an access frequency total with regard to the table data belonging to a data group and the calculation is performed based on the obtained key value-specific access frequency, determines whether the setting of data groups in the setting step satisfies the obtained data allocation condition, if the setting of the data groups in the setting step does not satisfy the obtained data allocation condition, then conducting again the setting and calculating steps, if the setting of the data groups in the setting step does satisfy the obtained data allocation condition, then performing disk group allocation and creating map information, wherein disk group allocation is a process in which one disk group is allocated to each of the data groups set in the setting steps, and carrying out a data allocation instruction which is a process in which the DBMS is instructed to store the table data in accordance with the map information created in the performing step.

13. A computer for use in a computer system including said computer and a storage system having at least one storage device including multiple disk groups that are physical storage areas for storing database data, wherein the disk groups are included in a storage device system included in the computer system, the database includes multiple tables, the table includes multiple records having multiple items, a specific item within the multiple items that is included in each of the multiple tables in common is set as a key having plural value ranges, and the computer comprises:

a database management system (DBMS) for managing said database;

a access frequency obtaining module configured to obtain an estimated access frequency for data of the table for each value range of the key; and a data allocation module configured to perform a process of data allocation to allocate, based on the obtained estimated access frequency, data of the table divided according to the value ranges of the key to the disk groups to be stored, wherein each value range of the reference item corresponds to a database area defined and managed by said DBMS, and wherein the process of data allocation includes:

obtaining a table/disk group correspondence which is information indicating a relationship between a table and disk groups including the physical storage areas that can be used to store the table, obtaining a key value-specific access frequency which is information indicating estimated access frequency to a table for a range of key values, obtaining a data allocation condition which is an access frequency-related condition that is applied when the allocation of database data is set, said data allocation condition is set by the administrator, setting data groups each being a collection of table data stored in a disk group, wherein the setting includes setting the same number of data groups as the number of disk groups that can be used for storage of table data and allocating the table divided by key value range to each data group, calculating loads on the data groups set in the setting step, wherein a load is defined as an access frequency total with regard to the table data belonging to a data group and the calculation is performed based on the obtained key value-specific access frequency, determines whether the setting of data groups in the setting step satisfies the obtained data allocation condition, if the setting of the data groups in the setting step does not satisfy the obtained data allocation condition, then conducting again the setting and calculating steps, if the setting of the data groups in the setting step does satisfy the obtained data allocation condition, then performing disk group allocation and creating map information, wherein disk group allocation is a process in which one disk group is allocated to each of the data groups set in the setting steps, and carrying out a data allocation instruction which is a process in which the DBMS is instructed to store the table data in accordance with the map information created in the performing step.

* * * * *